United States Patent
Rudroff

(10) Patent No.: US 9,719,837 B2
(45) Date of Patent: *Aug. 1, 2017

(54) METHOD AND APPARATUS FOR A BIDIRECTIONAL METER PROVING SYSTEM

(71) Applicant: WFMS, Inc., Sugar Land, TX (US)

(72) Inventor: Daniel J. Rudroff, Houston, TX (US)

(73) Assignee: WFMS, Inc., Sugar Land, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/457,702

(22) Filed: Aug. 12, 2014

(65) Prior Publication Data

US 2015/0027197 A1 Jan. 29, 2015

Related U.S. Application Data

(60) Continuation-in-part of application No. 14/165,552, filed on Jan. 27, 2014, which is a continuation-in-part of application No. 13/934,209, filed on Jul. 2, 2013, which is a division of application No. 12/128,932, filed on May 29, 2008, now Pat. No. 8,505,355.

(51) Int. Cl.
    *G01F 25/00* (2006.01)
(52) U.S. Cl.
    CPC .............................. *G01F 25/0015* (2013.01)
(58) Field of Classification Search
    None
    See application file for complete search history.

(56) References Cited

U.S. PATENT DOCUMENTS

| | | |
|---|---|---|
| 3,021,703 A | 2/1962 | Pfrehm |
| 3,120,118 A | 2/1964 | Boyle |
| 3,224,247 A | 12/1965 | Barrett, Jr. |
| 3,273,375 A | 9/1966 | Howe |
| 3,288,163 A | 11/1966 | Craven |
| 3,387,483 A | 6/1968 | Arsdale |
| 3,421,360 A | 1/1969 | Luse |
| 3,423,988 A | 1/1969 | Grove |
| 3,457,768 A | 7/1969 | Jasek |
| 3,472,280 A | 10/1969 | Scoy |

(Continued)

OTHER PUBLICATIONS

Rudroff, Daniel J., L.A.C.T. Units Metering Systems & Proving Systems, Welker Flow Measurement Systems, Inc., Rev. 4, Dec. 28, 2005, Sugar Land, Texas.

(Continued)

*Primary Examiner* — Robert R Raevis
(74) *Attorney, Agent, or Firm* — Husch Blackwell LLP

(57) ABSTRACT

During a water draw test, horizontal type bidirectional sphere provers with a straight calibrated section of pipe between the detector switches sometimes suffer from sphere launch failure which typically results in a failed water draw test. These types of provers, especially in larger pipe diameters will benefit from an elongate concentric fabricated reducer attached to the outlet of each launch tube. These elongate concentric fabricated reducers result in a successful sphere launch on the first attempt. Assuming all the other components of the prover are properly designed and assembled, a successful sphere launch will result in a successful water draw test on the first attempt saving time, money and reputation.

14 Claims, 13 Drawing Sheets

(56) References Cited

U.S. PATENT DOCUMENTS

| | | |
|---|---|---|
| 3,504,523 A | 4/1970 | Layhe |
| 3,530,705 A | 9/1970 | Lathrop |
| 3,580,045 A | 5/1971 | Pfrehm |
| 3,638,475 A | 2/1972 | Grove |
| 3,668,923 A | 6/1972 | Grove |
| 3,738,153 A | 6/1973 | Simmons |
| 3,777,545 A | 12/1973 | Griffin et al. |
| 3,798,957 A | 3/1974 | Moroney et al. |
| 3,800,587 A | 4/1974 | Clinton |
| 3,817,268 A | 6/1974 | Kirkwood |
| 3,830,092 A | 8/1974 | Dunegan et al. |
| 3,848,621 A | 11/1974 | Dickenson |
| 3,911,724 A | 10/1975 | Grove et al. |
| 3,943,749 A | 3/1976 | Van Scoy |
| 3,955,399 A | 5/1976 | Neal |
| 3,958,444 A | 5/1976 | Baker |
| 3,978,707 A | 9/1976 | Grove |
| 3,978,708 A | 9/1976 | Hayward |
| 3,998,089 A | 12/1976 | Grove |
| 4,012,939 A | 3/1977 | Hayward |
| 4,106,328 A | 8/1978 | Neeff |
| 4,128,002 A | 12/1978 | Cameron |
| 4,134,288 A | 1/1979 | Kim |
| 4,237,921 A | 12/1980 | Hayward |
| 4,481,805 A | 11/1984 | Dobesh |
| 4,481,806 A | 11/1984 | Schad |
| 4,566,307 A | 1/1986 | Boykin |
| RE32,157 E | 5/1986 | Waugh |
| 4,606,218 A | 8/1986 | Chisman |
| 4,829,808 A | 5/1989 | West |
| 4,947,675 A | 8/1990 | Webb |
| 5,317,895 A | 6/1994 | Ogawa et al. |
| 5,392,632 A | 2/1995 | Umeda et al. |
| 6,792,361 B2 | 9/2004 | Vun Cannon |
| 7,086,113 B2 | 8/2006 | Young |
| 8,505,355 B2 * | 8/2013 | Rudroff ............... G01F 25/0092 73/1.23 |
| 2006/0141242 A1 | 6/2006 | Keener |
| 2007/0119227 A1 | 5/2007 | Moriyama |
| 2008/0083262 A1 | 4/2008 | Augenstein et al. |

OTHER PUBLICATIONS

American Petroleum Institute, Manual of Petroleum Measurement Standards, Chapter 4—Proving Systems, Section 8—Operation of Proving Systems, First Edition Nov. 1995, Reaffirmed Mar. 2002.
Hayward, Alan T.J., Pipe Provers, A User's Manual, Cambridge University Press, 1991.
Photographs 1-7 of a Straight Run Bidirectional Sphere Prover located in Calcasieu Parish, Louisiana at the Targa Plant, 2008.
American Petroleum Institute, Manual of Petroleum Measurement Standards Chapter 4—Proving Systems, Third Edition Sep. 2003.

* cited by examiner

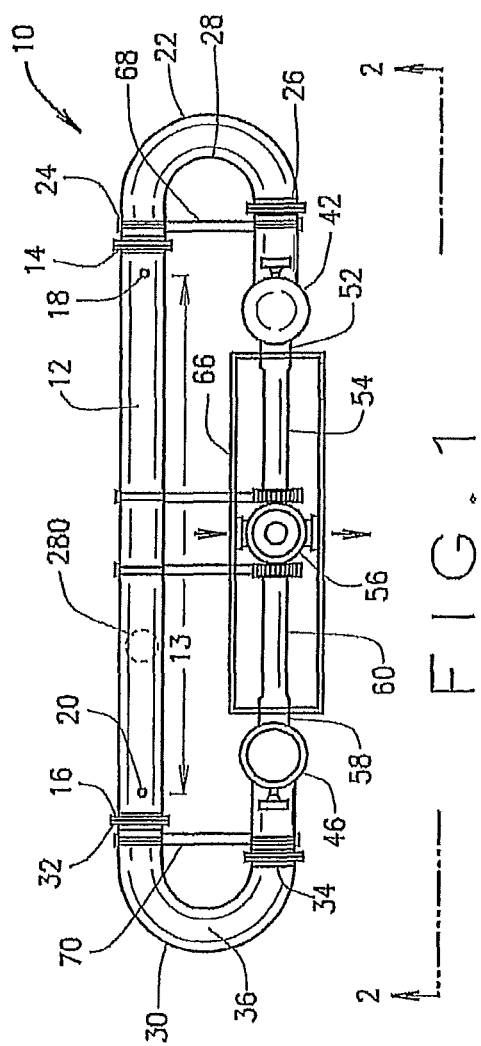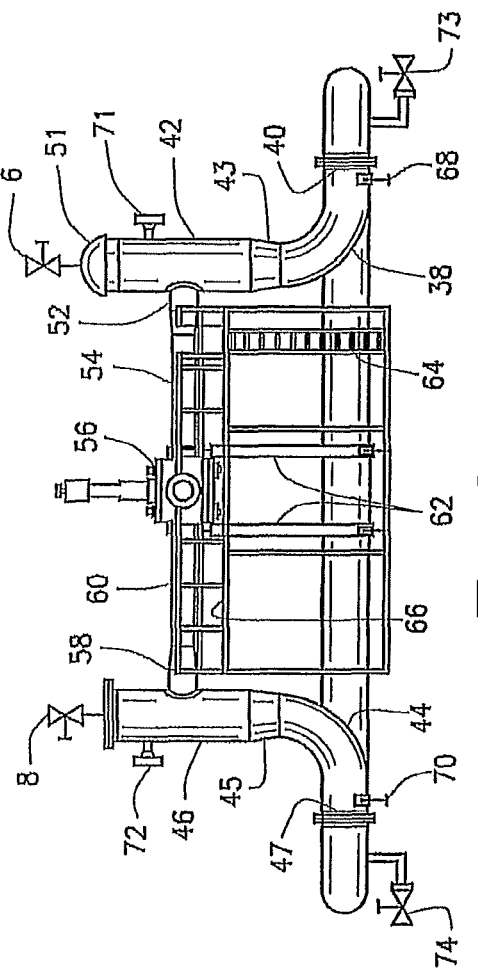

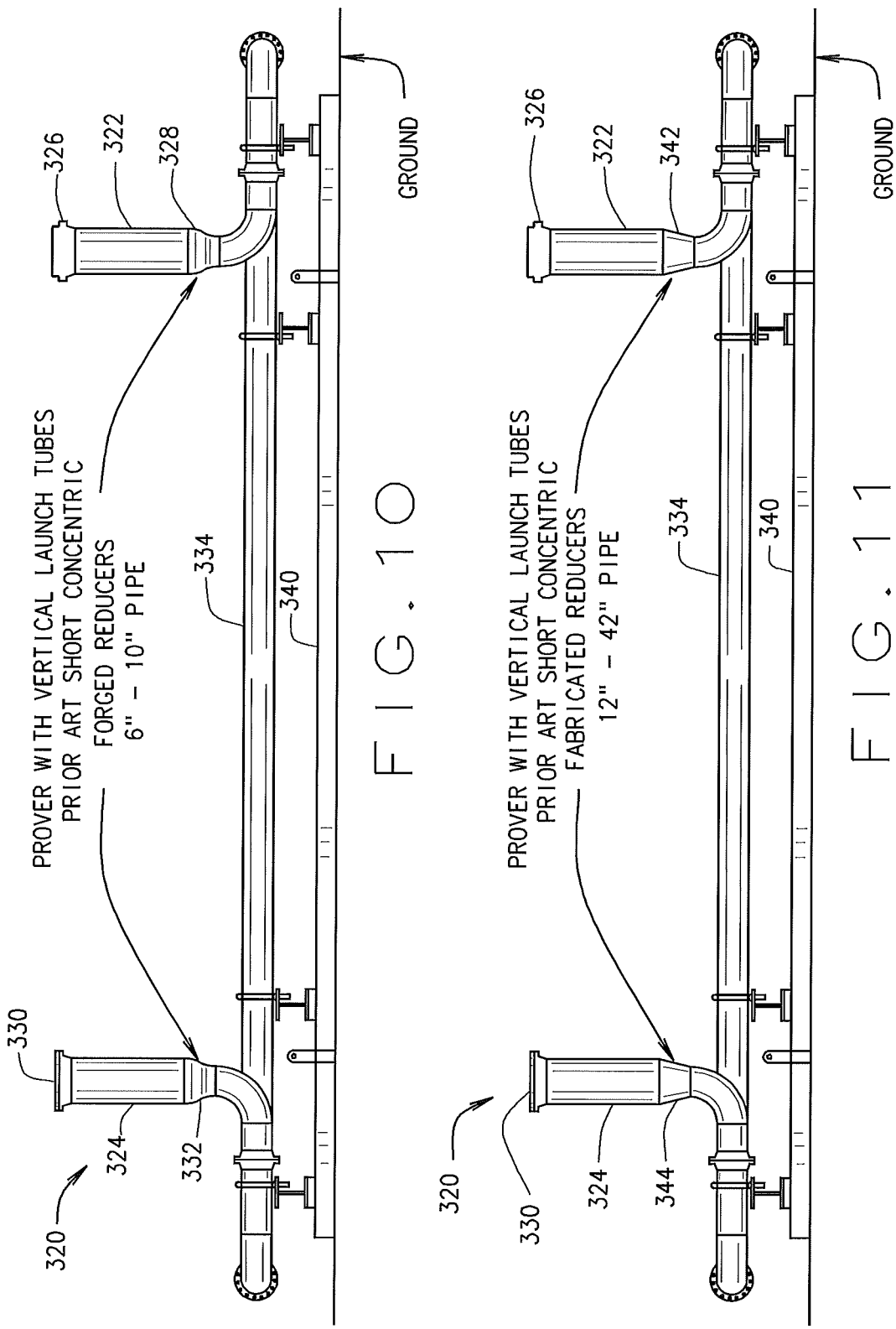

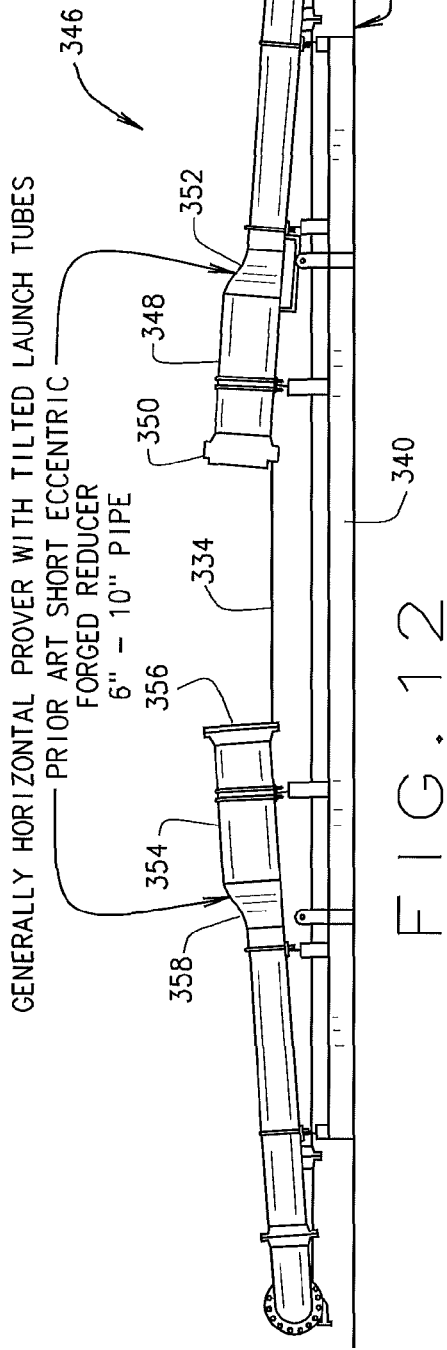
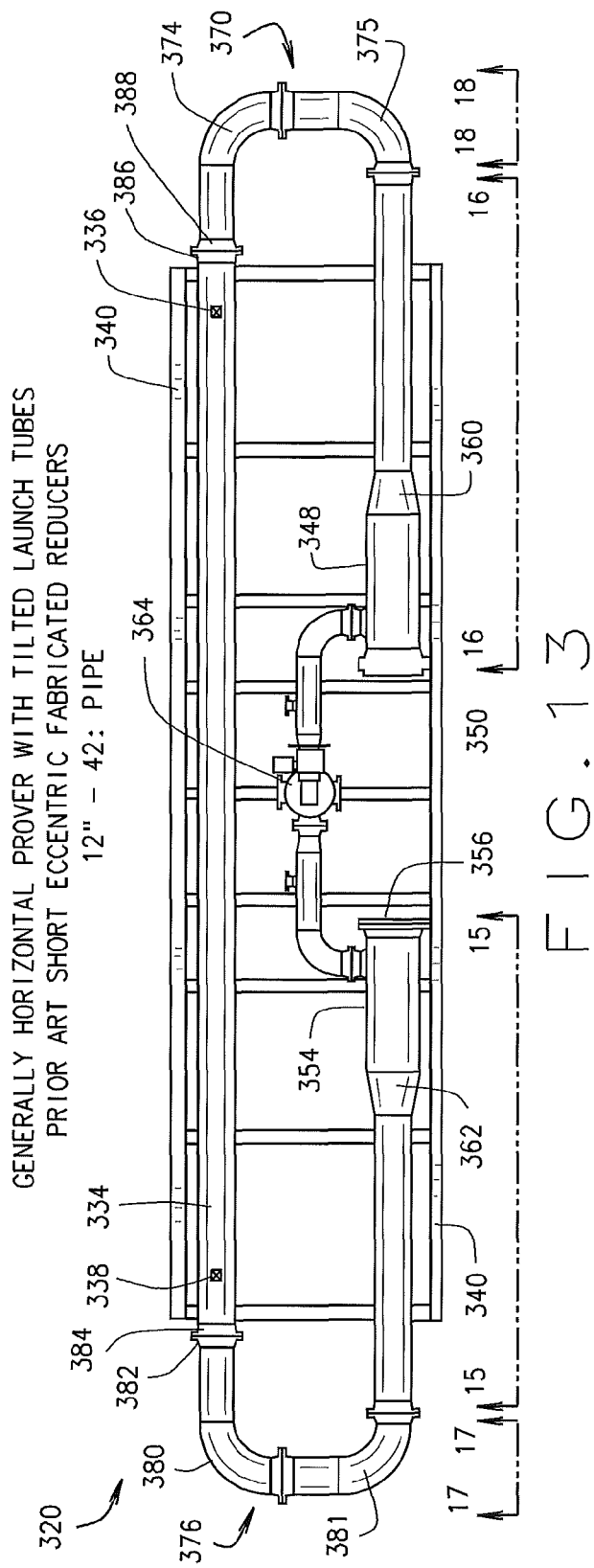

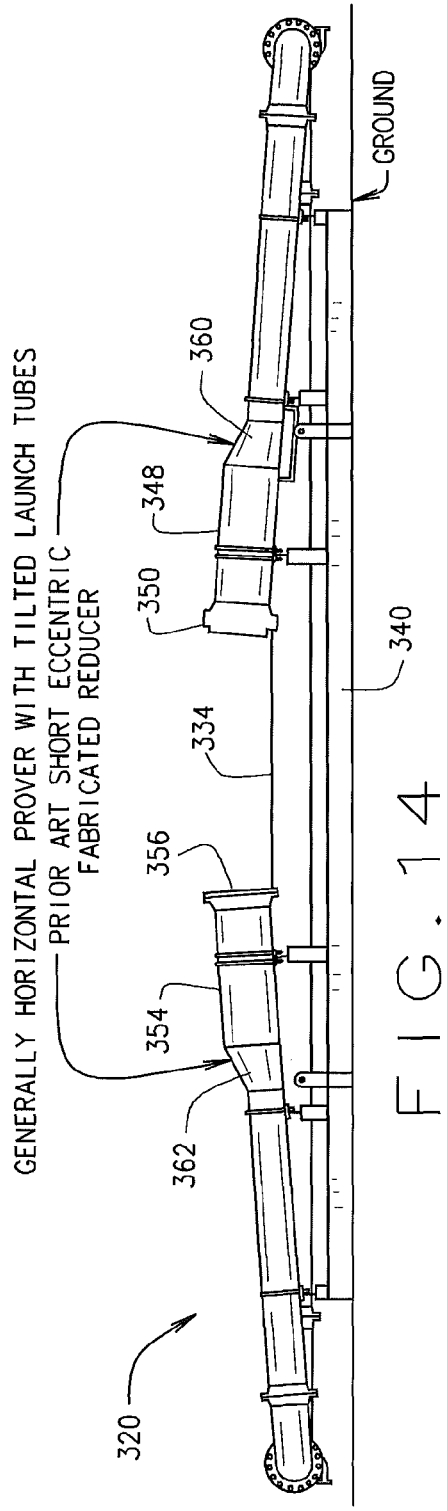
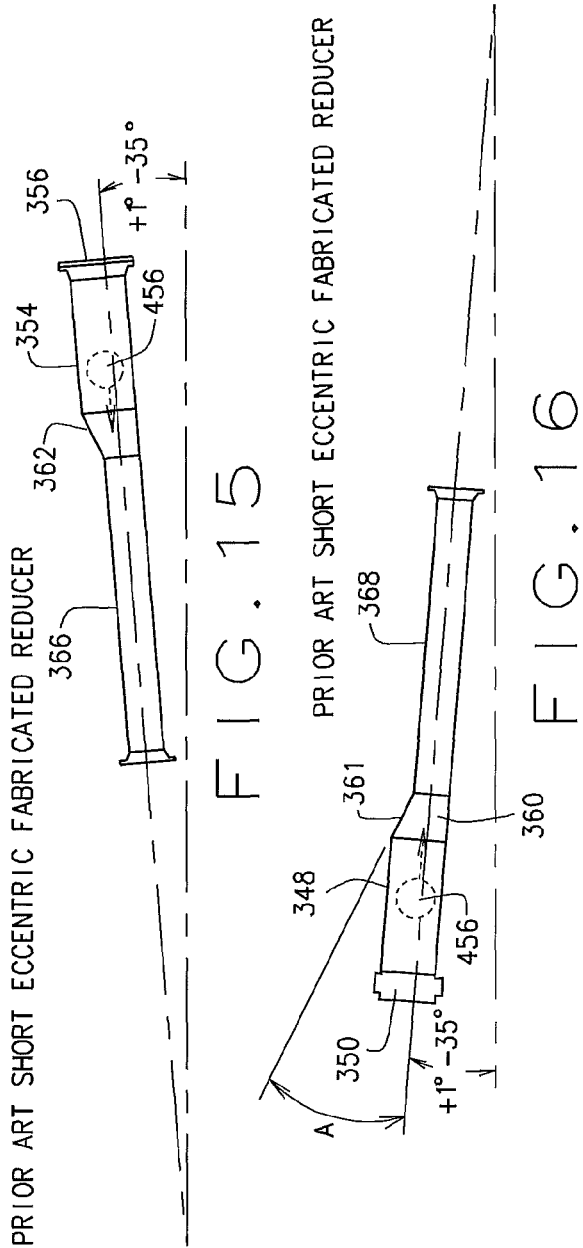

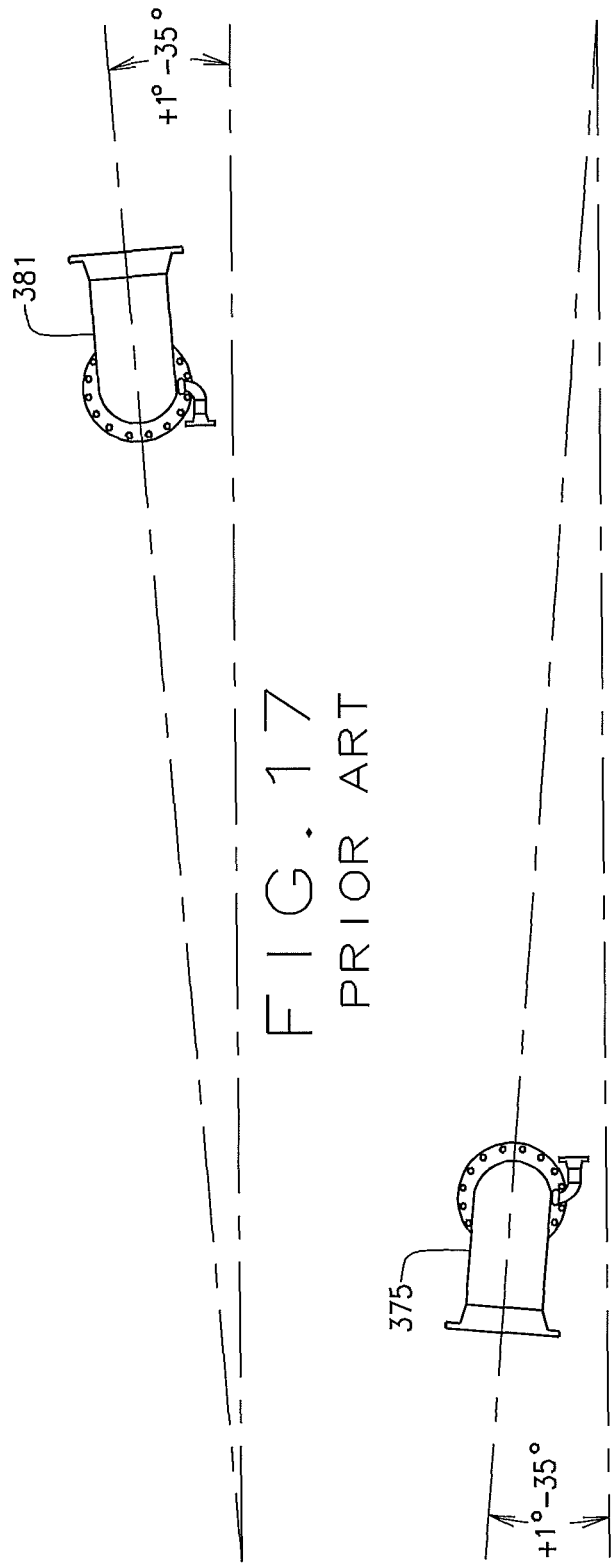
FIG. 17
PRIOR ART
FIG. 18
PRIOR ART
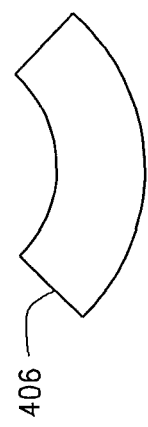
FIG. 19
FLAT PLATES FOR PRODUCTION OF A
PRIOR ART SHORT ECCENTRIC FABRICATRED REDUCER
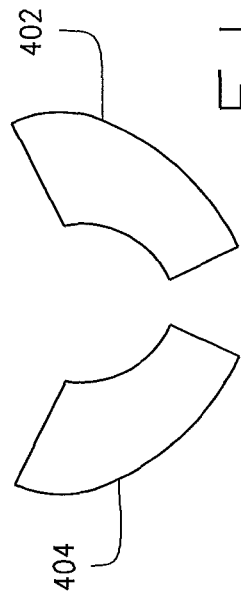
FIG. 20
FLAT PLATE FOR PRODUCTION OF A
PRIOR ART SHORT CONCENTRIC
FABRICATED REDUCER

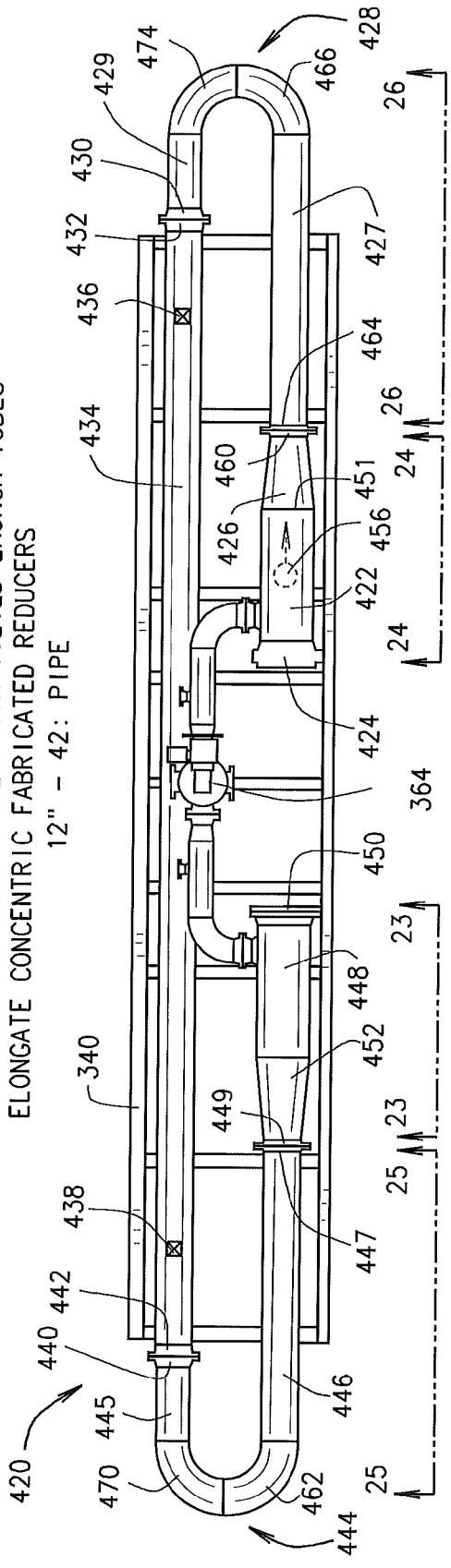

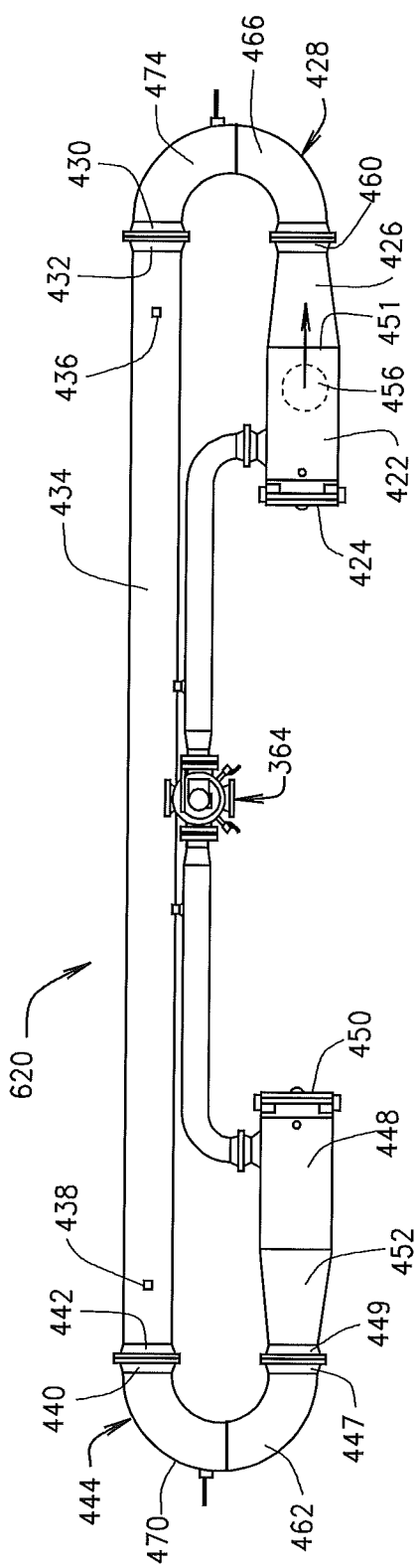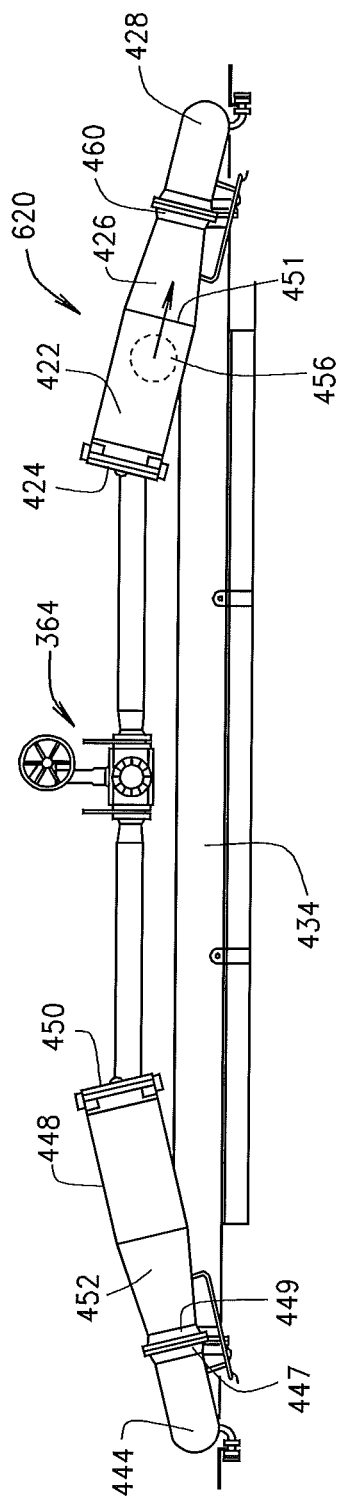
FIG. 29
FIG. 30

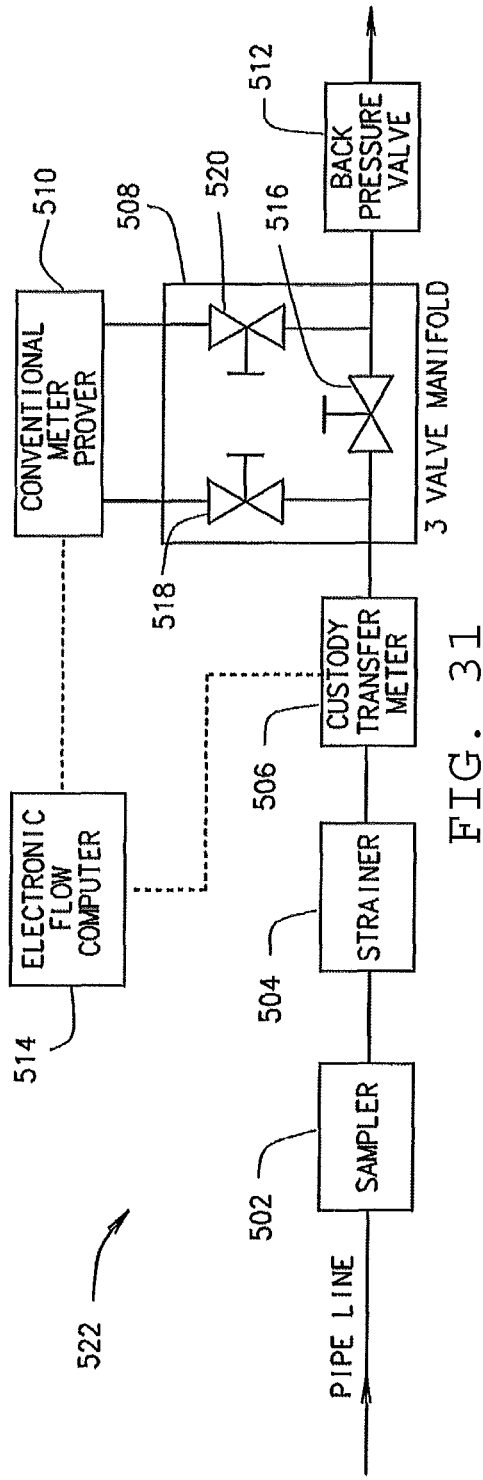
FIG. 31 PRIOR ART LEASE AUTOMATIC CUSTODY TRANSFER UNIT (L.A.C.T.)
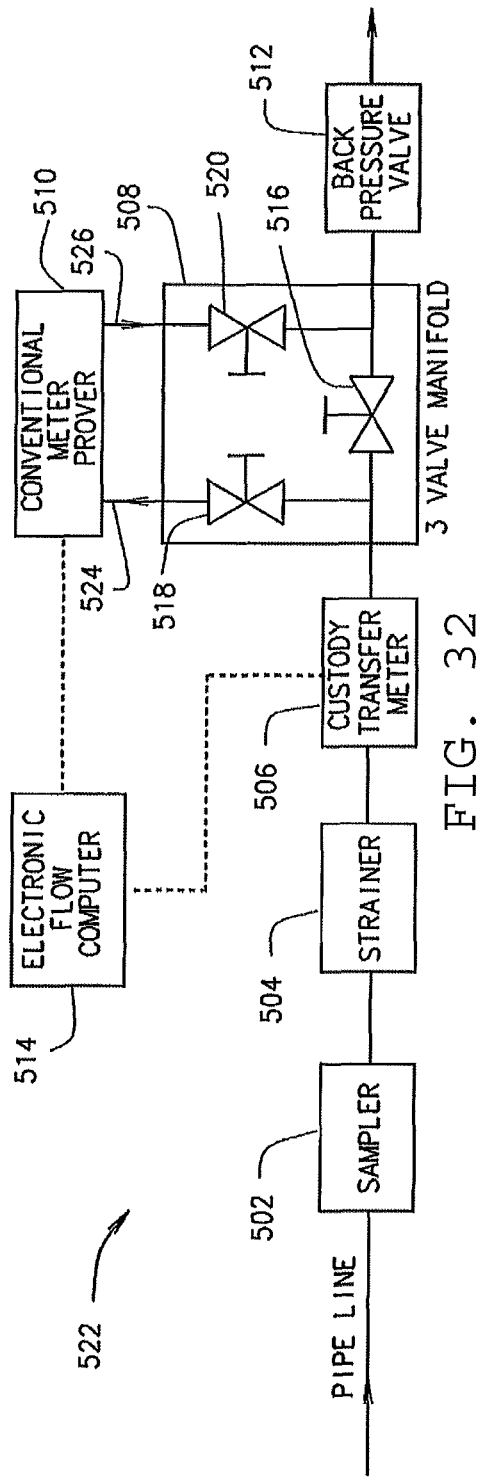
FIG. 32 PRIOR ART LEASE AUTOMATIC CUSTODY TRANSFER UNIT (L.A.C.T.)

METHOD AND APPARATUS FOR A BIDIRECTIONAL METER PROVING SYSTEM

CROSS-REFERENCE TO RELATED APPLICATION

This is a continuation-in-part of U.S. patent application Ser. No. 14/165,552 filed on Jan. 27, 2014 for a Method and Apparatus for a Bidirectional Meter Proving System, which is a continuation in part of U.S. patent application Ser. No. 13/934,209 filed on Jul. 2, 2013 for a Method and Apparatus for a Bidirectional Meter Proving System, now pending, which is a divisional of U.S. Pat. No. 8,505,355 for a Method and Apparatus for a Bidirectional Meter Proving System, which issued on Aug. 13, 2013. All are hereby incorporated by reference in their entireties to the extent permitted by law.

DESCRIPTION OF THE PRIOR ART

When crude oil is being offloaded from a tanker, a custody transfer typically takes place and ownership of the crude oil changes hands. Likewise, money changes hands and an accurate volumetric measurement of the crude oil is required. A lease automatic custody transfer unit (L.A.C.T.) also known as a Petroleum Metering System is typically used to measure the crude oil or other fluids. Those skilled in the art know that a L.A.C.T. unit typically includes a sampler, a strainer, a custody transfer meter, a 3-way valve and manifold, a meter prover, a back pressure valve, an electronic flow computer and other components. The present invention is a bidirectional sphere meter proving system with a straight calibrated section. This meter proving system with a straight calibrated section is one component in the L.A.C.T. unit. Attached to the Information Disclosure Statement is an article by Dan J. Rudroff entitled "L.A.C.T. Units Metering Systems & Proving Systems" which is incorporated herein by reference.

An early meter proving system, and perhaps the first, was developed by Shell in Texas and is described in the book, *Pipe Provers, A User's Manual* by Alan T. J. Hayward on page 2. According to this book, the idea was to determine the volume of about a one-mile length of pipe, and then to track the movement of a piston along this length, while noting the meter readings as the piston first entered and finally left the measured length of pipe. This development was also described in an article by M. A. Levy in *The Oil and Gas Journal*, entitled "Here's the Way to Proper Meter Calibration," Jun. 30, 1958. This early meter proving system was described as 'the measured mile' and 'the miracle mile'. This early meter proving system was inconvenient to use because, at the end of a run, the piston had to be removed from the pipe, transported back to its starting point by vehicle, and then re-inserted into the pipe. It also failed to give the accuracy required for modern custody transfer purposes, because the temperature was liable to vary along a mile of pipe to such an extent that thermal expansion of the oil introduced unacceptable errors. Further, there were flanges and welds in the pipe which introduced other errors.

Things have improved a lot since the "measured mile." Modern meter proving systems and custody transfer meters are much more accurate than these early efforts almost 50 years ago. Currently, modern custody transfer meters are divided into four categories as follows: positive displacement (PD) meters; turbine meters; coriolis meters and ultra sonic meters. PD and turbine meters combined make up more than 80% of the custody transfer meters currently in use in the U.S. for crude oil. Coriolis and ultra sonic meters generate "manufactured pulses." PD and turbine meters generate "actual pulses." Both the manufactured pulses and the actual pulses are counted by an electronic flow computer to calculate the volume of oil that is being offloaded.

Even modern custody transfer meters may sometimes get out of calibration which can make a big dollar difference when a tanker is being offloaded. Today, L.A.C.T. units always include a prover to make sure that the custody transfer meters are accurate throughout the metering process. It is common to make five or more prover "runs" during the offloading process. The custody transfer meter runs continuously during the offloading of the ship; however, the prover only runs periodically to check the accuracy of the custody transfer meter. If it takes the ship about 36 hours to offload, for example, each prover run may only take about 30 minutes, for example. Those skilled in the art know that L.A.C.T. units and provers are also used in other situations when a custody transfer occurs, for example when oil is taken from or added to a pipeline.

When the meter proving system is being run, the entire fluid flow from the custody transfer meter is diverted through the prover. Some electronic flow computers accumulate 10,000 pulses from the custody transfer meter during one pass through the prover. If fewer than 10,000 pulses are emitted from the custody transfer meter during the prover run, or if the pulses are unevenly spaced, the signals must be interpolated or more pulses taken. Interpolation is done by the electronic flow computer.

Crude oil meter proving systems in the U.S. are currently controlled by The American Petroleum Institute Manual of Petroleum Measurement Standards, Chapter 4—Proving Systems, Section 2, Displacement Provers, Third Edition, September 2003 (hereinafter sometimes referred to as, API Standard, Chapter 4, Section 2). This API Standard, a copy of which are included in the Information Disclosure Statement, have approved four types of meter proving systems as follows: a) unidirectional piston provers, see page 8; b) bidirectional piston provers, see page 9; c) unidirectional sphere provers, see page 6 and d) bidirectional sphere provers, see page 9. As previously noted, the present invention is a bidirectional sphere meter proving system.

A. Unidirectional Piston Provers

Historically, unidirectional piston provers have been referred to as "small volume provers." These provers typically accumulate less than 10,000 unaltered pulses from the custody transfer meter during one pass of the piston displacer and therefore require pulse interpolation. Since the small volume of these provers may not allow for the accumulation of 10,000, unaltered pulses, the electronic flow computer must provide means for pulse interpolation. The only practice currently recognized by the API for pulse interpolation is double chronometry. In the crude oil business in the U.S., these unidirectional piston provers represent about 3 to 5% of the provers currently in operation for custody transfer purposes. The following patents refer to unidirectional piston provers: U.S. Pat. Nos. 3,955,399; 4,481,805; 4,829,808 and 5,317,895.

B. Bidirectional Piston Provers

Bidirectional piston provers have a straight length of pipe through which the piston travels back and forth, actuating a detector at each end of the calibrated section. Suitable supplementary piping and a 4-way reversing valve or valve assembly that is either manually or automatically operated make possible the reversal of the flow through the prover. In the U.S., these bidirectional piston provers represent about 2 to 10% of the provers currently in operation for crude oil custody transfer purposes. The following patents refer to bidirectional piston provers: U.S. Pat. Nos. 3,021,703; 3,120,118; 3,273,375; 3,457,768; 4,606,218; 5,392,632; and Reissue 32,157.

C. Unidirectional Sphere Provers

Typical unidirectional prover piping is arranged so that the sphere is returned to a start position using a sphere handling interchange. A sphere is described in U.S. Pat. No. 7,086,113. These provers typically use electro-mechanical detector switches. The design of the prover usually allows the accumulation of 10,000 meter pulses for a proving pass. However, designs that accumulate less than 10,000 meter pulses may be used for meter proving provided pulse interpolation is used and additional criteria defined in paragraph 4.3.2.2 of the API Standard is followed. In the U.S., these unidirectional sphere provers represent about 10 to 15% of the provers currently in operation for crude oil custody transfer purposes.

The following patents reference unidirectional sphere provers: U.S. Pat. Nos. 3,224,247; 3,387,483; 3,504,523; 3,638,475; 3,738,153; 3,777,545; 3,800,587; 3,817,268; 3,830,092; 3,848,621; 3,911,724; 3,943,749; 3,998,089; 4,128,002; 4,134,288 and 4,947,675.

D. Bidirectional Sphere Provers

The present invention is a bidirectional sphere prover. Prior art bidirectional sphere provers typically have a calibrated U-shaped length of pipe or a calibrated serpentine section of pipe through which the sphere travels back and forth, actuating a detector switch near each end of the pipe. Suitable supplementary piping and a reversing valve or valve assembly that is either manually or automatically operated make possible the reversal of the flow through the prover. These provers typically use mechanical detector switches. A prior art bidirectional U-shaped sphere prover is shown on page 10 of the API Standard. In the U.S., these bidirectional sphere provers represent about 70 to about 80% of the provers currently in operation for crude oil custody transfer purposes.

There are several differences between prior art bidirectional piston provers and prior art bidirectional sphere provers. The prior art bidirectional piston proves typically use a machined piston that passes through a honed or machined cylinder. The inside of the calibrated piping in a bidirectional sphere prover is not machined or honed and is typically coated with a corrosion inhibitor such as epoxy. Many prior art bidirectional piston provers use proximity detector switches which do not penetrate the pipe wall to detect the passage of the piston. Many bidirectional sphere provers use mechanical detector switches which actually penetrate the pipe wall to detect passage of the sphere. The proximity detector switch will not detect passage of a typical sphere. Bidirectional piston provers do not have launch chambers like bidirectional sphere provers. Because of these many structural differences, the piston and the sphere are not interchangeable between these two types of prior art provers.

The API Standard on page 9, paragraph 3.12.1 states as follows: "The main body of the prover (bidirectional sphere prover) is often a straight piece of pipe but it may be contoured or folded to fit in a limited space or to make it more mobile." Notwithstanding the comments in the API Standard, Applicant's are aware of only one straight run bidirectional sphere prover which is located in Calcasieu Parish, La. at the Targa plant. A photograph of this bidirectional sphere prover at the Targa plant is included in the Information Disclosure Statement. The Targa prover has a flange in the middle of the calibrated section of pipe between the two detection switches. The pipe diameter on the Targa prover is about 16 to 20 inches, the distance between the two detector switches is about 50 feet and the total length of the straight pipe run is about 70 to about 80 feet long.

The present invention relates to a bidirectional spherical prover that uses a straight run of calibrated pipe between the two detection switches. Unlike the prior art, there are no flanges, welds or elbows between the detection switches of the present invention. The present invention has numerous advantages over conventional bidirectional spherical provers, which use a U-shaped calibrated section of pipe or a serpentine calibrated section of pipe which includes several elbows and flanges. These calibrated elbows and machined flanges used in prior art provers are expensive. The following patents refer to bidirectional sphere provers: U.S. Pat. Nos. 3,423,988; 3,530,705; 3,472,280 and 3,798,957. The following patents refer to bidirectional plug type provers: U.S. Pat. Nos. 3,421,360; 3,580,045 and 3,668,923. The following patents refer to provers and related equipment: U.S. Pat. Nos. 3,288,163; 3,958,444; 3,978,708; 3,978,707; 4,012,939; 4,237,921; 4,481,806 and 6,792,361.

Bidirectional sphere provers with a straight calibrated section of pipe between the detector switches are produced by the Assignee of the present patent application in at least two general categories. In the first category, the launch tubes are oriented generally perpendicular to the straight calibrated section of pipe (see FIGS. 2, 10 and 11). In the industry, this design is also sometimes referred to as a "vertical prover" because the launch tubes are oriented generally vertical with respect to the ground. In the second category, the launch tubes are oriented generally parallel to the straight calibrated section of pipe in top view (see FIGS. 3, 13 and 21). In some designs the launch tubes are oriented generally horizontal to the ground (see FIG. 4); in other designs, the launch tubes are tilted slightly from true horizontal (see FIGS. 12, 14 and 22). In the industry, this second category of designs are sometimes collectively referred to as "horizontal provers" because the launch tubes are oriented horizontally to the ground or some tilted launch tubes are oriented closer to horizontal than vertical. Since 2008, all of these prover designs have operated well during normal metering in the field, where flow rates often exceed 200 gpm.

(i) Launch Success with Vertical Type Prover Designs During a Water Draw

Bidirectional sphere provers with a straight calibrated section of pipe between the detector switches having launch tubes with a vertical orientation to the ground (see FIGS. 1, 2, 10 and 11) have not had problems launching the sphere on the first water draw attempt at the plant where flow rates are in the range of approximately 40-60 gpm, and during water draw tests after installation in the field where flow rates are also in the range of approximately 40-60 gpm. The Assignee believes this successful sphere launch phenomena is due to the effects of gravity which helps transport the sphere as it moves from the launch tube through a reducer to downstream piping. The reducers previously used in vertical launch tubes were of two types: a) concentric forged reducers in smaller diameter pipe, in the range of approximately 6-10 inch nominal diameter (see FIG. 10) and b) concentric fabricated reducers in larger diameter pipe in the range of approximately 12-42 inch nominal diameter (see FIG. 11). These prior art concentric forged and prior art concentric fabricated reducers have a length of less than 1.25 times the diameter of the downstream pipe. In other words, the length of these prior art concentric reducers are less than 1.25 times the diameter of the smaller outlet, which connects to the downstream piping.

For years, the shape and dimensions of these prior art concentric reducers has remained the same. Concentric forged reducers are described in ASME Standard 16.9. Fabrication shops have used standard dimensions for fabricated concentric reducers as outlined in, e.g. *Pressure Vessel Handbook* by Eugene F. Megyesy, 14$^{th}$ Edition, 2008 by Pressure Vessel Publishing. These prior art concentric forged and prior art concentric fabricated reducers may sometimes be referred to hereinafter as the "short concentric forged reducer" and the "short concentric fabricated reducer" to better distinguish them from the present invention. FIG. 2 shows short concentric fabricated reducers.

(ii) Launch Difficulties with Horizontal Type Prover Designs During a Water Draw Unlike vertical-type prover designs, the horizontal-type prover design has, from time to time, failed to launch the sphere on the first water draw attempt, especially in larger size pipe ranging from approximately 12 inch nominal diameter to approximately 42 inch nominal diameter at the plant and in the field.

End users typically prefer to use horizontal type prover designs because it is much easier to remove the sphere from the generally horizontal launch tubes, than the vertical type prover design. For example, using a vertical type prover design fabricated from 36 inch diameter pipe, the top of the launch tubes is often 12-15 feet above the ground which sometimes necessitates use of a crane to remove a larger sphere which may need to be replaced or just checked, from time to time. (Throughout this application reference to pipe diameter refers to the diameter of the straight calibrated section of pipe; launch tubes have a larger diameter of pipe to allow fluid flow past the sphere and into the 4-way valve.)

Failure to launch the sphere in a horizontal type prover design during the first water draw attempt at the manufacturing plant is embarrassing, expensive and causes delay. All water draw tests are witnessed by a "company man", who is or represents the buyer/operator/end user of the prover. If the horizontal type prover fails to pass the water draw test at the manufacturing plant on the first attempt, the Assignee's reputation is sullied and future business may be lost.

Bidirectional sphere provers with a straight calibrated section of pipe between the detector switches having horizontal type launch tubes have been built by the Assignee using prior art eccentric forged reducers used in smaller type pipe ranging from approximately 6 inches in diameter to approximately 10 inch diameter nominal pipe size. Forgings become expensive in larger pipe sizes. Therefore, the Assignee has used prior art eccentric fabricated reducers in larger type pipe ranging from approximately 12-42 inch nominal pipe diameter to reduce costs. These prior art eccentric forged and prior art fabricated reducers also have a length of less than 1.25 times the diameter of the downstream pipe. The above described prior art eccentric forged reducers and the prior art eccentric fabricated reducers may sometimes hereinafter be referred to as the "short eccentric forged reducer" and the "short eccentric fabricated reducer" to better distinguish them from the present invention. FIGS. 3 and 4 show short eccentric fabricated reducers. For years, the shape and dimensions of short forged eccentric reducers has remained the same as prescribed in ASNI Standard 16.9. For years, the shape of the short fabricated eccentric reducers has remained the same. Fabrication shops have used standard dimensions for fabricated eccentric reducers as outlined in guide books, e.g. *Pressure Vessel Handbook* by Eugene F. Megyesy, 14$^{th}$ Edition, 2008 by Pressure Vessel Publishing.

This sphere launch problem in horizontal type provers has been recognized, but the cause of the problem was previously unknown. There is a need for a better horizontal bidirectional sphere prover design that will usually launch the sphere on the first water draw attempt at the plant and after installation in the field. Tilting both launch tubes from the horizontal has not resulted in a consistent sphere launch in larger diameter pipe sizes.

SUMMARY OF THE INVENTION

The present invention is a bidirectional sphere prover that uses a straight run of calibrated pipe between the two detection switches. This portion of pipe is also sometimes referred to as the straight calibrated section of pipe between the two detection switches. This portion of pipe is referred to as "calibrated" because the volume of the straight section between the detector switches has been verified by a third party using a technique which is referred to as a "water draw" in the industry.

To conduct the initial calibration session for a newly manufactured prover using the water draw technique, a third party drives a truck to the manufacturing plant for the bidirectional sphere prover. The Seraphin® tanks on the truck are calibrated and certified. The seraphin tanks are filled with water and so is the prover. The Seraphin tanks on the truck are connected to the prover with hose. Air is purged from the entire system.

Water is pumped into the prover forcing the sphere to travel between the detectors. When the sphere activates the first switch the water is diverted into Seraphin tanks whose precise volume is directly traceable to NIST the National Institute of Standards and Technology. When the second detector switch the water flow is diverted to the pump holding tank. The amount of water in the Seraphin tanks is then determined. The Seraphin tanks are then emptied and the ball is then sent in the opposite direction and the procedure repeated. The combined volume from the forward and reverse runs is combined as one pass. Two more passes are made each of which has to be within 0.02% of the other. These three trips are averaged and this becomes the prover calibrated volume between the detector switches. For this reason, the straight section of pipe in the present invention between the two detection switches is referred to as "calibrated".

The straight run of calibrated pipe in the present invention is free of flanges, welds, elbows and other impediments used in the prior art. The bidirectional sphere prover may be used to prove meters that measure liquids, such as crude oil and gasoline. The invention has numerous advantages over the prior art. First it is more accurate. The present invention will allow the custody transfer meter to produce about 10,000 pulses which are substantially evenly spaced between each other. The present invention will allow the sphere to move at a substantially constant velocity between the detector switches. Second, the invention has reduced pressure drop which makes it less expensive to operate. (Pressure drop is a negative feature in liquid transportation systems which increases operating costs.) Third, the invention is cheaper to produce because there is no need for raised face weld neck forged steel flanges which are commonly referred to as machined flanges or superior quality elbows which are expensive. When coriolis and ultra sonic meters are being used, the calibrated straight section of pipe is shorter than prior art bidirectional sphere provers. Fourth, the invention can be inspected in the field without recalibrating using a water draw, which is a substantial operational saving. Fifth, there is no modification to the integrity of the components, unlike the prior art, because the invention may be produced from standard unaltered flanges and elbows.

Horizontal type prover designs, especially in larger pipe diameters sometimes fail to launch the sphere during the first water draw test at the plant and in the field. This is embarrassing, and can cause delays and/or loss of follow-on business. Applicant was the first to recognize the cause of this sphere launch problem. The sphere launch problem is caused by a lack of concentricity and an abrupt angle of contact with the sphere compared to prior art short eccentric fabricated reducers.

To solve this sphere launch problem, Applicant developed an alternative embodiment in which an elongate concentric fabricated reducer which is more concentric and presents a more gradual angle of contact with the sphere. Prior art short eccentric fabricated reducers have an abrupt angle of contact of about 27° and the new elongate concentric fabricated reducer presents a more gradual angle of contact of about 6° as measured from the centerline of downstream piping.

The elongate concentric fabricated reducer has never been used before on horizontal or vertical type provers. This elongate concentric fabricated reducer is for use on horizontal type prover designs having a pipe size in the range of from approximately 12-42 inches in diameter, nominal size. The new elongate concentric fabricated reducer is twice as long as the diameter of the downstream piping connected to the reducer outlet. The new elongate concentric fabricated reducer is two pipe diameters long; prior art designs are less than 1.25 pipe diameters long. In other words, the overall length of the new elongate concentric fabricated reducer is more than 60% longer than any prior art eccentric or concentric reducer used by Applicant. These elongate concentric fabricated reducers are designed to be used on horizontal type prover designs with tilted launch tubes, with or without a conduit between the U-Tube and the reducer; the elongate concentric fabricated reducer usually results in a successful sphere launch on the first attempt. Assuming all the other components of the prover are properly designed and assembled, a successful sphere launch will result in a successful water draw test on the first attempt. These elongate concentric fabricated reducers have solved a nagging industry-wide problem for horizontal type prover designs, especially in larger pipe diameters.

BRIEF DESCRIPTION OF THE DRAWINGS

FIG. 1 is top view of the bidirectional sphere prover with vertical launch tubes.

FIG. 2 is a side view of the bidirectional sphere prover with vertical launch tubes along the line 2-2 of FIG. 1.

FIG. 10 is a side view of a bidirectional sphere prover with a small pipe diameter having vertical launch tubes and prior art short concentric forged reducers.

FIG. 11 is a side view of a bidirectional sphere prover with a large pipe diameter having vertical launch tubes and prior art short concentric fabricated reducer.

FIG. 12 is a side view of a generally horizontal bidirectional sphere prover with small pipe diameter having tilted launch tubes and prior art short eccentric forged reducers.

FIG. 13 is a top view of a generally horizontal bidirectional sphere prover with tilted launch tubes and prior art short eccentric fabricated reducers.

FIG. 14 is a side view of the generally horizontal bidirectional sphere prover with tilted launch tubes and prior art short eccentric fabricated reducers of FIG. 13.

FIG. 15 is a side view of a portion of the generally horizontal bidirectional sphere prover of FIG. 13 along the line 15-15.

FIG. 16 is a side view of a portion of the generally horizontal bidirectional sphere prover of FIG. 13 along the line 16-16.

FIG. 17 is a side view of a portion of the generally horizontal bidirectional sphere prover of FIG. 13 along the line 17-17.

FIG. 18 is a side view of a portion of the generally horizontal bidirectional sphere prover of FIG. 13 along the line 18-18.

FIG. 19 is a top view of flat plates for production of a prior art short eccentric fabricated reducer, modified and from page 280 of the *Pressure Vessel Handbook* by Eugene F. Megyesy, 14th Edition, 2008 by Pressure Vessel Publishing.

FIG. 20 is a top view of a flat plate for production of a prior art shore concentric fabricated reducer.

FIG. 21 is a top view of a generally horizontal bidirectional sphere prover with tilted launch tubes and elongate concentric fabricated reducers.

FIG. 22 is a side view of the generally horizontal bidirectional sphere prover with a large pipe diameter having tilted launch tubes and elongate concentric fabricated reducers of FIG. 21.

FIG. 29 is a top view of a generally horizontal bidirectional sphere prover with tilted launch tubes and elongate concentric fabricated reducers similar to that in FIGS. 21 and 22, without a conduit between the U-tubes and the reducers.

FIG. 30 is a side elevation view of the generally horizontal bidirectional sphere prover of FIG. 29.

FIG. 31 is a block diagram of the major components of a prior art lease automatic custody transfer unit, better known in the industry as an L.A.C.T. unit. In this view, fluid is not flowing from the pipeline through the conventional prover.

FIG. 32 is a block diagram of the major components of a prior art least automatic custody transfer unit, better known in the industry as an L.A.C.T. unit. In this view, fluid is flowing from the pipeline through the conventional prover.

DETAILED DESCRIPTION OF THE INVENTION

Figure 5:
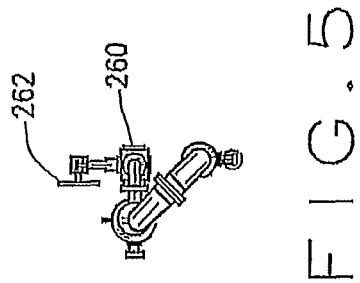
FIG. 5 is a end view of the bidirectional sphere prover with horizontal launch tubes along the line 5-5 of FIG. 4.

Referring now to FIGS. 1 and 2, the bidirectional sphere meter proving system of the present invention is generally identified by the numeral 10. A straight piece of pipe 12 has a first flange 14 and an opposing second flange 16 on the ends. The flanges 14 and 16 are not altered by machining nor are any of the other flanges in the present invention. Prior art provers require machined flanges in the calibrated sections of piping; the present invention does not use flanges in the calibrated section of piping and does not require machined flanges anywhere else in the prover. Those skilled in the art know that machined flanges are much more expensive than standard flanges. A first detection switch 18 and a second detection switch 20 are positioned in the pipe 12 to indicate when the sphere 280, shown in phantom, passes through the straight calibrated section 13 of conduit 12. The straight calibrated section 13 is free of welds, flanges and elbows. The internal circumference of the conduit 12 is coated with a corrosion inhibitor such as epoxy or some other suitable substance. This coating also gives the prover sphere 280 a smooth surface to seal against and move across. A phenolic corrosion inhibitor called Plasticap A is available from Techni-Kote, Inc. of Houston, Tex. and is suitable for this purpose. The inhibitor is applied to a thickness of about 5 to about 8 mils and is rated for temperatures of up to about 325° F. (163° C.).

A first U-tube has a first flange 24, a second flange 26 and a weld 28 in the middle. The first flange 24 mates with the first flange 14 of the conduit 12. A second U-tube 30 has a first flange 32, a second flange 34 and a weld 36 in the middle. The first flange 32 of the second U-tube mates with the second flange 16 of the conduit 12. Those skilled in the art know that in standard pipe construction, there is a clearance or gap of about ⅛ inch between the id of the bolts and the id of the bolt hole in a standard flange. This is acceptable for ordinary piping situations, but for provers, it can damage the sphere. To avoid this problem and the expense of machined flanges, Applicant's recommend that the standard flanges in the present invention first be aligned with four or more low tolerance bolts that only have a clearance or gap of about 0.003 to about 0.004 inches between the od of the bolt and the id of the bolt hole, instead of the conventional clearance of about ⅛ inch. These low tolerance bolts are sometimes referred to as "shoulder bolts" in the industry. After the flanges have been correctly aligned with four or more low tolerance bolts, the other bolts may have a standard clearance or gap. However, the present invention does not have a flange in the straight calibrated section 13 of pipe 12, between the two detector switches 18 and 20.

A first elbow 38 is welded to a flange 40 on one end and on the opposite end to the first vertical launch tube 42. A second elbow 44 is welded to a flange 47 on one end and on the opposite end to the second vertical launch tube 46. A grate 48, not shown, is formed in the port 52 on the first launch tube to keep the sphere in the launch tube. A grate 50, not shown, is formed in the port 58 on the second vertical launch tube 46 to keep the sphere in the second launch tube. When there is no fluid flow through the prover, the sphere 280 will sink to the bottom 43 of the first launch tube or the bottom 45 of the second launch tube. On the top of the first launch tube 42 is a quick open closure 51. The quick open closure is an off the shelf item which can be purchased from any number of suppliers including: Modco Industries of Conroe, Tex., see www.modcoindustries.com and, TD Williamson of Tulsa, Okla., See, www.tdwilliamson.com. The quick open closure can have several mechanical means of operation, such as threads, clamps, etc. The purpose is to allow easy access to the first launch tube for maintenance of the prover, for example to replace the sphere 280. The sphere is heavier than the liquid being measured so when there is no fluid flow through the prover 10 the sphere will settle to the bottom of a launch tube. The port 52 connects to conduit 54 which connects to a bidirectional port 290 on the 4-way valve 56, better seen in FIG. 8. The ports 52 and 58 are larger than the piping 54 and 60 coming from the 4-way valve 56. These ports are made larger to reduce the pressure drop caused by the grate 48, not shown. The 4-way valve is an off the shelf item that can be purchased from several vendors including Cameron, headquartered in Houston, Tex., (www.c-a-m.com) and SPX Corporation a global multi-industry manufacturing company (www.spx.com). The SPX Flow Control division is located in Houston, Tex. The port 58 connects to the conduit 60 which connects to the second bidirectional port 294 on the 4-way valve 56, better seen in FIG. 8.

A ladder 64, when required, allows an operator to climb from the ground to the catwalk 66 and inspect/operate the 4-way valve. Supports 68 engage the first U-tube 22 and supports 70 engage the second U-tube 30 and are typical of additional supports for the system. A first water draw connection port 71 is positioned in first launch tube 42. A second water draw connection port 72 is positioned in second launch tube 46. A first drain 73 is positioned in the U-tube 22. A second drain 74 is formed in the U-tube 30. A first vent valve 6 is positioned in the top of quick open closure 51 and a second vent valve 8 is positioned in the top of second launch tube 46. These vent valves are used to vent all the air from the prover. A differential switch, not shown, is placed across the 4-way valve to verify sealing.

Figure 3:
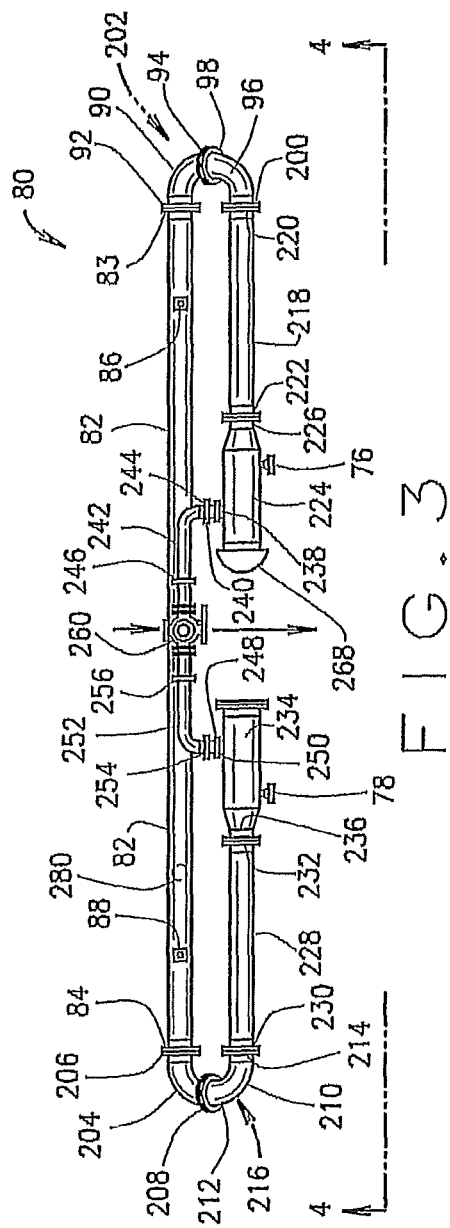
FIG. 3 is a top view of the bidirectional sphere prover with horizontal launch tubes.
Figure 4:
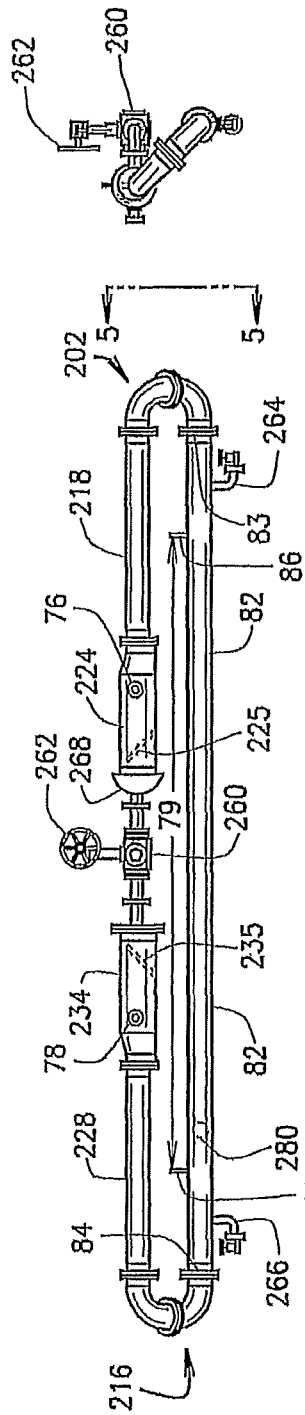
FIG. 4 is a side view of the bidirectional sphere prover with horizontal launch tubes along the line 4-4 of FIG. 3.

Referring now to FIGS. 3, 4 and 5, a bidirectional sphere meter proving system with horizontal launchers is generally identified by the numeral 80. A conduit 82 includes a straight calibrated section 79. The conduit 82 has a first flange 83 on one end and a second flange 84 on the opposite end. The flanges 83 and 84 are not machined, unlike the prior art, nor are any of the other flanges in the present invention. A first detection switch 86 and a second detection switch 88 are positioned in the straight calibrated section 79 of conduit 82. The detection switches indicate when the sphere 280, shown in phantom, passes through the straight calibrated section 79 of conduit 82. A first elbow 90 has a first flange 92 on one end and a second flange 94 on the other end. A second elbow 96 has a first flange 98 on one end and a second flange 200 on the opposite end. Flange 94 and 98 are bolted together to form a U-tube 202. The U-tube 202 can be fabricated from two flanged elbows as shown in these figures and/or it can be fabricated from two elbows of pipe as in the preceding figures which are welded together.

The flange 92 connects to the flange 83 on the straight calibrated section 82. A first elbow 204 has a first flange 206 on one end and a second flange 208 on the opposite end. A second elbow 210 has a first flange 212 on one end and a second flange 214 on the opposite end. The first elbow 204 and the second elbow 210 form a second U-tube 216. The second U-tube 216 can be fabricated from two flanged elbows as shown in these figures and/or it can be fabricated from two elbows of pipe as in the preceding figures which are welded together. The flange 206 connects to the flange 84 on the straight calibrated section of conduit 82. The first and second U-tubes and elbows of the present invention are not required to be of superior quality and the flanges are not machined which reduces manufacturing costs and maintains the integrity of the flange.

A conduit 218 has a flange 220 on one end and another flange 222 on the opposite end. The conduit 218 connects the U-tube 202 with the first horizontal launch tube 224. A quick open closure 268 is mounted on one end of the first horizontal launch tube 224. The quick open closure allows access to the interior of the first horizontal launch tube for maintenance, for example, if the sphere needs to be replaced. The first horizontal launch tube has a flange 226 on one end and a port 238 extending from the midsection. The port 238 includes a flange 240. A grate, not shown in the port 238, keeps the sphere from being pulled into the conduit 242 leading to the 4-way valve 260. The conduit 242 has a flange 244 on one end and a second flange 246 on the other end. A first water draw connection port 76 is formed in the first horizontal launch tube 224.

A conduit 228 has a flange 230 on one end and a second flange 232 on the opposite end. The conduit 228 connects the second U-tube 216 to the second horizontal launch tube 234. The second horizontal launch tube 234 includes a flange 236 and a port 248 extending from the midsection. The port 248 includes a flange 250. A grate, not shown in the port 248, keeps the sphere from being pulled pull out of the second horizontal launch tube into the conduit 252 leading to the 4-way valve 260. The conduit 252 has a first flange 254 on one end and a second flange 256 on the opposite end. The id of the port 238 is greater than the id of the conduit 242. A second water draw connection 78 is formed in the second horizontal launch tube 234. A first drain 264 is formed in conduit 82 and a second drain 266 is formed in conduit 82 to facilitate draining of the prover 80 for maintenance.

A ramp 225, shown in phantom, is formed in the first horizontal launch tube and a ramp 235, shown in phantom, is formed in the second horizontal launch tube as better seen in FIG. 4. The ramps are shown for illustrative purposes in the drawing. In actuality, the ramps 225 and 235 are not high enough to block access to the sphere in the first launch tube 224 after the quick open closure 268 has been opened. The sphere can be removed and inserted over the ramp 225 in the first launch tube 224. As previously mentioned, the sphere is heavier than the fluid being measured, so the sphere rolls down the ramps by the force of gravity when there is no fluid flow through the prover. The purpose of the ramps is to properly position the sphere for the next run so the sphere will start to move through the prover and not be trapped in either launch tube when the fluid flow is reversed. A circular handle 262, or electric motor operator, not shown, operates the 4-way valve.

Figure 6:
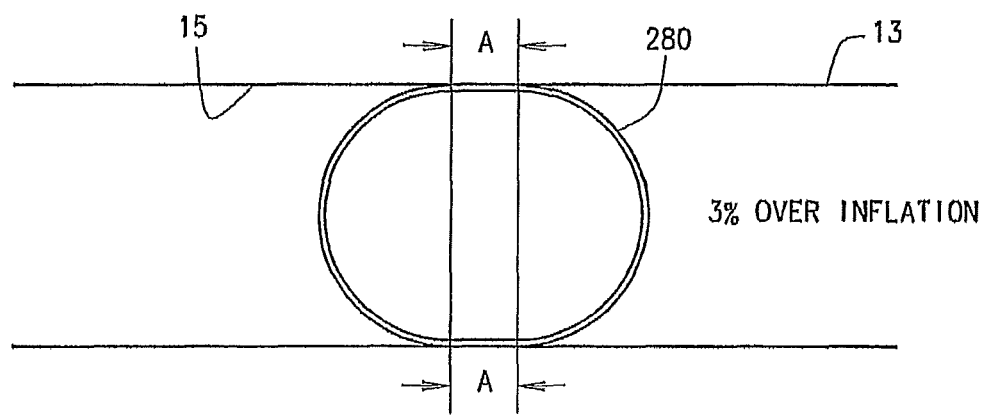
FIG. 6 is a section view of the sphere in the straight calibrated section of the bidirectional sphere prover with an overinflation of 3%.

FIG. 6 is a section view of the sphere 280 in the straight calibrated section 13 of the conduit 12 with an overinflation of 3%. In this figure, the nominal size of the conduit is 36 inches and the sphere is over inflated to 3% of the cross sectional area of the interior of the conduit. The area of contact of the sphere with the interior diameter 15 of the pipe wall is shown diagrammatically by the distance "A" which is about 10.1725 inches. Because of the overinflation, the ball is compressed and a portion, diagrammatically shown by the distance "A" is elongated and contacts the interior diameter 15 of the pipe for an elongated distance. As is well known to those skilled in the art, the sphere is often filled with a 50/50 solution of glycol and water. In a nominal 36 inch diameter prior art prover the sphere is often over inflated to approximately 6% of the crossectional area of the prover id as shown in the next figure. Using the present invention, it is only necessary to over inflate the sphere 3% of the crossectional area of the id of the pipe which results in a system pressure drop of about 2 to about 3 psi.

Figure 7:
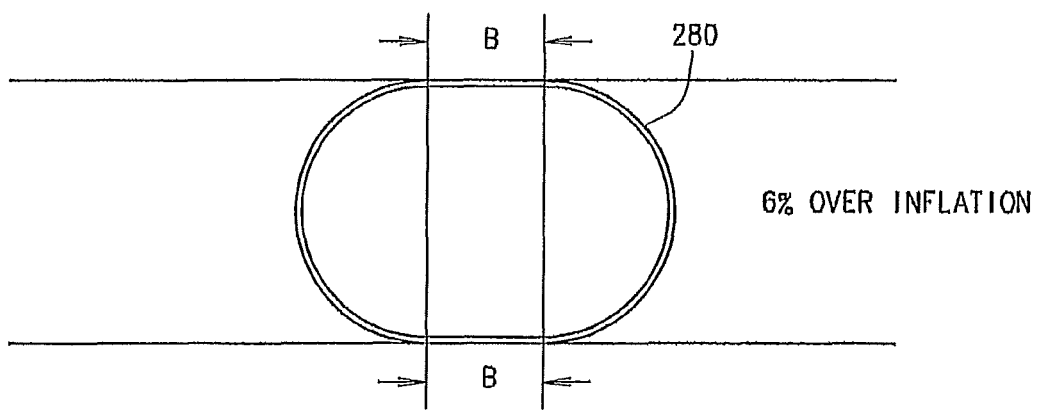
FIG. 7 is a section view of the sphere in the straight calibrated section of the bidirectional sphere prover with an overinflation of 6%.

FIG. 7 is a section view of the sphere 280 in the calibrated section of a prior art prover with an overinflation of 6%. In this figure the length of contact area of the sphere in a 36 inch pipe is represented by the arrows "B" which is about 12.75 inches. This results in a system pressure drop of about 5 to about 6 psi. The higher the pressure drop, the more expensive it is to operate the prover. In prior art provers with over inflated spheres of 6% and higher pressure drops, the electric motors require more electricity to power the pumps needed to move the sphere between the two detector switches. Therefore lower pressure drop is a good thing. The present invention has a reduced pressure of about 25% when compared with a prior art system using a 36 inch nominal conduit and a 6% overpressure. The increased inflation is to accommodate for the imperfections found in the id of standard pipe elbows, welds and flange alignments all found in prior art. The current invention has eliminated the negative impact of those inherent, costly and nearly unavoidable imperfections.

Prior art provers of about 12 inches or more over inflate the sphere to about 4% over size. The present invention has a reduced pressure drop of about 8% when compared with a prior art system of 12 inches and an over size sphere of 4%. Prior art provers of about 30 inches or more typically use an over size prover sphere of 6% or more. As previously mentioned, the present invention has a reduced pressure drop of about 25% when compared with such prior art systems.

The present invention may be fabricated in any common pipe size including 6 inch, 8 inch, 10 inch, 12 inch, 16 inch, 20 inch, 24 inch, 30 inch, 36 inch and 40 inch. The size of the pipe, 12 and 82, the length of the straight calibrated section, 13 and/or 79, and the distance between the two detector switches will vary. The minimum volume of the straight calibrated section of pipe is determined by paragraphs 4.3.3, et al of the API Standard, Chapter 4, Section 2, which is incorporated herein by reference. The maximum and minimum sphere velocities are explained in paragraphs 4.3.4, et al of the API Standard, Chapter 4, Section 2, which is incorporated herein by reference. The prover diameter depends on the minimum and maximum flow rates and the minimum and maximum displacer velocities as explained in paragraph 4.3.5, et al of the API Standard, Chapter 4, Section 2, which is incorporated herein by reference. The distance between the detector switches on a prover is determined by the number of pulses the custody transfer meter produces per barrel of fluid. The API Standard recommends a minimum of 10,000 pulses be generated by the meter as the ball travels from one detector switch to the other.

As an example, if the custody transfer meter produces 1,000 pulses per barrel, and the number of pulses between the switches needs to be 10,000, then 10,000/1,000 equals 10 barrels or 420 gallons of volume of flow is needed between the switches. The API Standard, Chapter 4, Section 2 allows a prover sphere to achieve a velocity of between 0.5 and 5 feet per second while moving through the prover. The velocity of the sphere can be determined by the formula: distance in feet divided by time in seconds. The distance or length the liquid occupies is determined by the volume inside the pipe. The volume is determined by the inside area of the pipe in square feet times the length of the pipe in feet. This will give the cubic feet which can be converted to barrels or gallons. There are 6.742 cubic feet in a barrel of petroleum. Larger volumes of flow will require larger diameters of pipe to keep the velocity under 5 feet per second.

The 420 gallons of flow between the detectors may be obtained by using a shorter, large diameter straight calibrated section or a longer, smaller diameter calibrated section. The price of the pipe, flanges and fittings and maintaining a sphere velocity of between 0.5 to 5 ft/second define the size and length of pipe used in the present invention. The present invention does not normally require pulse interpolation because the velocity of the sphere in the straight calibrated section is sufficient to provide the 10,000 meter pulses required by the API Standard. The velocity of the sphere is more or less constant through the straight calibrated section of the prover and there are no elbows. This means that the meter pulses are more evenly spaced which makes the present invention more accurate than prior art designs. The absolute velocity of the sphere through the prover is not critical. However, maintaining a substantially constant sphere velocity through the straight calibrated sections, 13 and 79 is important to prover accuracy.

In a typical crude pipeline or oil offloading terminal, centrifugal or piston pumps are used to move the oil through the custody transfer meter and the prover. When the centrifugal pumps see a pressure increase in the system, the pump drops the flow rate coming from the pump, as is well known to those skilled in the art. Therefore, in prior art provers when the sphere encountered a weld, elbow or flange, the volume of fluid coming from the centrifugal pump would diminish and the pressure drop would increase which would result in uneven pulse from the custody transfer meter. The present invention produces substantially evenly spaced pulses because there are no impediments in the straight calibrated section between the two detector switches and therefore no substantial change in fluid flow rate. To make the most accurate measurement possible, the following variables should be held constant or near constant: fluid temperature, fluid composition, fluid pressure and fluid flow rate. The present invention does a better job of keeping the fluid pressure and the fluid flow rate constant during a prover run than prior art designs which makes the present invention more accurate.

According to the API Standard, Chapter 4, Section 2, paragraph 1.3, a "prover pass" is one movement of the sphere between the detectors in a prover. A "prover round trip" refers to the forward and reverse pass in a bidirectional prover, like the present invention. A "prover run" is typically 5 prover round trips in a bidirectional prover working with liquid petroleum such as crude oil, or gasoline.

After the present invention has been built, it is necessary to calibrate the apparatus before it is sent to the field. Calibration is done using a water draw, which is well known to those skilled in the art. All the air in the piping and launch tubes of the prover is displaced by water. To calibrate the present invention, three round trips with water are required and each measurement result must be within 0.02% of the other. If the prover does not meet these levels of accuracy, it may not be sent to the field. This water drawn is done by third parties and may take a couple of hours on a small prover to a full day on a larger prover, assuming everything goes well. Once the bidirectional sphere prover has been calibrated at the plant it is sent to the field to be used in conjunction with a Petroleum Metering Systems or L.A.C.T. units. In the field, the API Standard requires that five round trips be made for each run and that each round trip have a measurement result that is within 0.05% of the others. It is common to make five or more runs during the offloading of a tanker assuming the custody transfer meter and the prover all agree. Pipeline meters are proved on a regular basis depending on company standards. Pipeline meters are always proved when there is a significant change in product being metered, the pressure, the temperature or especially the flow rate. If there is disagreement, more prover runs will be made. The improved accuracy of the present invention due to the lack of elbows, welds and flange mating imperfections in the straight calibrated section will typically reduce the need for additional runs in excess of 5 which are required by the API Standard.

Figure 8:
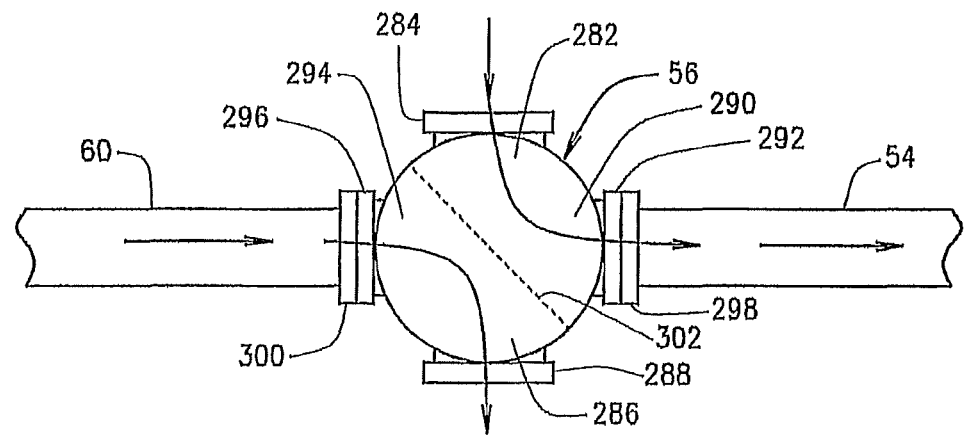
FIG. 8 is a diagrammatic view of a 4-way valve arranged to flow crude oil counter clockwise through the prover of FIG. 1.
Figure 9:
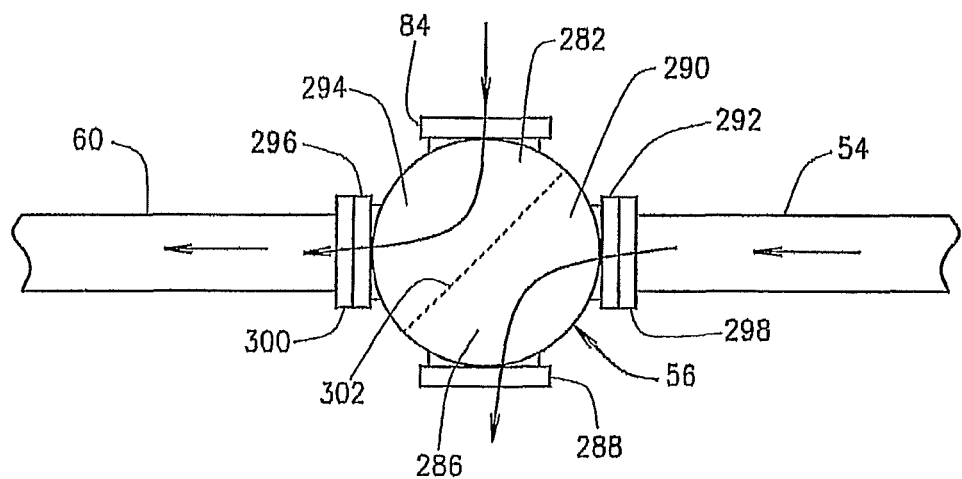
FIG. 9 is a diagrammatic view of the 4-way valve arranged to flow crude oil clockwise through the prover of FIG. 1.

Referring now to FIGS. 8 and 9. FIG. 8 is a diagrammatic view of the 4-way valve 56 arranged to flow crude oil counter clockwise through the prover of FIG. 1. FIG. 9 is a diagrammatic view of the 4-way valve 56 arranged to flow fluid clockwise through the prover of FIG. 1. An inlet port 282 in the 4-way valve is surrounded by an inlet flange 284. An outlet port 286 in the 4-way valve is surrounded by an outlet flange 288. A first bidirectional port 290 is surrounded by first bidirectional flange 292. A second bidirectional port 294 is surrounded by a second bidirectional flange 296. A flange 298 is formed on the conduit 54 and is connected to first bidirectional flange 292. A flange 300 is formed on conduit 60 and connects to second bidirectional flange 296. The numeral 302 indicates the valve element 302 which is illustrated by the dashed line through the center of the 4-way valve 56.

In FIG. 8 fluid flows into the inlet port 282 of the 4-way valve and is diverted by the valve element 302 into the conduit 54 as indicated by the flow arrows. This causes the fluid to flow counter clockwise through the prover of FIG. 1. The fluid returns to the conduit 60 and enters the second bidirectional port 294 of the 4-way valve and is diverted by the valve element to the outlet port 286 as indicated by the flow arrows.

In order to reverse the flow of the fluid through the bidirectional fluid, the valve element 302 is turned to the opposite direction. Fluid then enters the inlet port 282 of the 4-way valve and is diverted by the valve element to the conduit 60 as indicated by the flow arrows. This causes the fluid to flow in the opposite direction through the prover of FIG. 1 causing the sphere to move in the opposite direction past the two detention switches of the prover. The fluid then returns via the conduit 54 and is diverted by the valve element to the outlet port 286 as indicated by the flow arrow. The valve element 302 may be manually turned or automatically controlled by an actuator, not shown.

According to API Standard, Chapter 4, Section 2, paragraph 4.2.4., the output from the primary flow element of positive displacement and turbine meters, or other types of meters, can exhibit variations even when flow rate through the meter is constant. These variations are caused by imperfections and/or wear in bearings, blades, sensory plugs and other moving parts. Gears, universal joints, clutches and other mechanical devices that compensate, calibrate and transmit the output of the primary flow element can cause variations in the indicated flow rate signal that are greater than those caused by the primary flow element.

Three types of pulse train variations can be caused by the custody transfer meter as follows: interpulse deviation, which refers to random variation between consecutive pulses, pulse rate modulation, which refers to a pattern of variation in pulse rate or K factor; and pulse burst variations which refers to meters that do not have a frequency output proportional to flow and where the pulses are transmitted intermittently. These variations occur even when the flow rate through the meter is constant. They also affect the meter pulse count during a proving run and the error in the meter pulse count. The present invention does not eliminate interpulse deviation, pulse rate modulation and pulse burst variation caused by the custody transfer meter.

The present invention reduces or eliminates other types of pulse train variations which can also be caused by the prover. The sphere does not undergo any substantial changes in velocity while passing through the straight calibrated section of the present invention which makes it more accurate than prior art designs with elbows, welds and flanges in the calibrated section. For example, when a sphere goes through the elbow of a prior art prover it tends to slow down slightly which causes variation in the pulse train. The speed of the sphere in prior art designs is adversely affected because the elbows have a different radius on the inside than on the outside of a bend and elbows are not perfectly round. This causes the ball to slow down while passing through the elbow. As the sphere slows down, the fluid flow rate diminishes and so does the frequency of the pulse output. When the ball leaves the elbow, it speeds up and so does the fluid flow rate. The pulses are therefore closer together.

Some forms of pulse interpolation use the average time between pulses to determine the volume between the last pulse and when the sphere hits the sphere detector. If this average is not correct then the volume of the last partial pulse will not be correct. For example, when the sphere goes past a set of flanges in a prior art prover, it may speed up slightly if the flanges are larger than the id of the pipe or it may slow down slightly if the flanges are slightly smaller than the id of the pipe which causes variation in the pulse train. When the sphere encounters the increased friction caused by a smaller diameter in the pipe it slows down causing the flow rate to slow down at this point. The slower flow causes a slower pulse output and a faster flow causes a faster pulse output. The pulse output is directly proportional to the flow. The more constant the fluid flow rate through the prover, the more constant is the pulse output rate. For example, when the sphere goes past a weld in a prior art prover, it may speed up slightly if the weld is ground into the pipe or it might slow down slightly if the weld is not ground enough, causing a slight protrusion into the pipe, which may cause variation in the pulse train. The current invention encourages a consistent speed and therefore a consistent pulse train, which is a very positive attribute for a prover design.

Operation of the Bidirectional Meter Proving System

This is a description of a prover pass where the sphere 280 moves from the first launch tube 42 to the second launch tube 46 in a counter clockwise direction through the prover 10 of FIGS. 1, 2, 8 and 9. First, a valve on the L.A.C.T. unit or Petroleum Metering System, not shown in these drawings, is opened allowing fluid to flow from the custody transfer meter, not shown, into the inlet port 282 of the 4-way valve 56, as shown by the flow arrows in FIG. 8. At the beginning of this prover pass, the sphere is at the bottom 45 of the second sphere launcher 46. To begin the prover pass, the 4-way valve 56 is actuated reversing the flow through the prover as best seen in FIG. 9.

As the sphere 280 begins the prover pass, the fluid flow through the prover is clockwise when looking at FIG. 1. The fluid enters the second sphere launcher via conduit 60. The fluid flow causes the sphere to pass through the elbow 44, the U-tube 30 and past the second detector switch 20, through the straight calibrated section 13 of the pipe 12, past the first detector switch 18, the U-tube 22, the elbow 38 and into the first launcher 42. While the sphere passes between the two detector switches, the custody transfer meter sends approximately 10,000 pulses proportional to the flow that are as evenly spaced as the custody transfer meter is capable of generating to the custody flow computer, not shown. There may be one or multiple custody flow computers connected in a network to a server. The flow computer(s) may be located on a prover skid, a meter skid, a control room or in some combination thereof.

In order to make the reverse pass, the 4-way valve is actuated as shown in FIG. 8 causing the fluid flow to pass counter clockwise through the prover 10 of FIG. 1. At the beginning of the pass, the sphere is at the bottom 43 of the first launch tube 42. The fluid enters the first sphere launcher via conduit 54. This fluid flow causes the sphere to pass through the elbow 38, the U-tube 22, past the first detector switch 18, through the straight calibrated section 13 of pipe 12, past the second detector switch 20, through the U-tube 30, the elbow 44 and into the second launch tube 46. While the sphere passes between the two detector switches, the custody transfer meter sends approximately 10,000 pulses that are as evenly spaced as the custody transfer meter is capable of generating to the custody flow computer, not shown. These two passes complete what is called a round trip. Five round trips that are within 0.05% of each other complete a prover run.

Bidirectional Meter Proving System with Elongate Concentric Fabricated Reducer

FIG. 10 is a side view of a bidirectional sphere proving system with vertical launch tubes and prior art short concentric forged reducers. The bidirectional sphere prover 320 is mounted on a skid 340 which rests on a concrete pad on the ground. The bidirectional sphere prover has a first launch tube 322 and a second launch tube 324 both of which are aligned generally vertically with the ground. In the industry, these types of provers are also sometimes referred to as a "vertical prover". The launch tubes are also generally perpendicular to the straight section of calibrated pipe 334. These bidirectional sphere proving systems may also be mounted on concrete pads and pylons, not show, for use in water or a swamp; in the alternative, it may be mounted underneath other measuring equipment.

On one end of the first launch tube 322 is a "quick opening closure" 326 and welded on the other end is a prior art short concentric forged reducer 328. Forged reducers are expensive and are typically used on smaller sized pipe such as 6 inch to approximately 10 inch, but this is an arbitrary range and some may have been used occasionally with larger size pipe. Prior art fabricated reducers are less expensive to make than forged reducers; therefore prior art fabricated reducers are generally used on larger size pipe such as from about 12 inches to about 42 inches, but this is an arbitrary range and some fabricated reducers may have been used occasionally on smaller size pipe.

On one end of the second launch tube 324 is a removable blind plate 330 attached by nuts and bolts, not shown, and welded on the other end is a prior art short concentric forged reducer 332. The quick opening closure 326 on the first launch tube 322 is faster to open for access to the interior of the launch tube than the blind plate 330; but the blind plate 330, is less expensive than the quick opening closure. The price of a bidirectional sphere prover is important because cost considerations are one factor in purchasing decisions by the buyer/operator/end user. Therefore, one quick opening closure is put on one launch tube and the other launch tube is fitted with the blind plate.

FIG. 11 is a side view of a bidirectional sphere prover with vertical launch tubes and a prior art short concentric fabricated reducer. As previously mentioned, fabricated reducers are less expensive to produce than forged reducers in larger pipe sizes. The diameter of the provers appears the same in FIGS. 10 and 11, but these drawings are not to scale. FIG. 11 is produced with larger size pipe in the range of from approximately 12 inches to approximately 42 inches and FIG. 10 is produced in smaller size pipe in the range of from approximately 10 inches to approximately 6 inches.

The bidirectional sphere prover 320 is mounted on a skid 340 which rests on the ground. The bidirectional sphere prover has a first launch tube 322 and a second launch tube 324 both of which are aligned generally vertically with the ground. On one end of the first launch tube 322 is a "quick opening closure" 326 and welded on the other end is a prior art short concentric fabricated reducer 342. On one end of the second launch tube 324 is a blind plate 330 attached by nuts and bolts, not shown, and welded on the other end is a prior art short concentric fabricated reducer 344. Both of the bidirectional sphere provers 320 in FIGS. 10 and 11 include a straight calibrated section of pipe 334 which includes a first and a second detector switch, not shown in these views.

FIG. 12 is a side view of a generally horizontal bidirectional sphere prover with tilted launch tubes and prior art short eccentric forged reducers. The generally horizontal bidirectional sphere prover 346 with tilted launch tubes is referred to a "generally horizontal" because the launch tube are closer to horizontal relative to the ground than the previously described vertical provers in FIGS. 10 and 11. The launch tubes are referred to as "tilted" because they are not parallel relative to the ground; they are tilted slightly relative to the ground as measured from the centerline of the downstream piping, not the centerline of the launch tubes.

These launch tubes and the downstream piping may be tilted relative to the ground in the range of from approximately 1° to approximately 35°, and preferably in the range of from approximately 1° to approximately 25°, and more preferably from approximately 1° to approximately 15° to help the sphere roll downhill by the force of gravity from each launch tube, as better seen in FIGS. 15 and 16. Again, these angles are measured from the centerline of the downstream piping, not the centerline of the launch tubes.

The first launch tube 348 has a quick opening closure 350 on one end and a prior art short eccentric forged reducer 352 is welded on the other. The second launch tube 354 has a removable blind plate 356 on one end and welded on the other end is a prior art short eccentric forged reducer 358. For decades, horizontal and generally horizontal provers have been built with eccentric reducers because it was generally believed in the industry that the shape and dimensions of the eccentric reducer was the best design for launching the sphere. Applicant was the first to discover that that the prior art eccentric reducer, contrary to industry wisdom, was in fact, a cause of sphere launch failure during a water draw, especially in larger diameter pipe.

FIG. 13 is a top view of a generally horizontal bidirectional sphere prover with tilted launch tubes and prior art short eccentric fabricated reducers. FIG. 14 is a side view of the generally horizontal bidirectional sphere prover with tilted launch tubes and prior art short eccentric fabricated reducers of FIG. 13.

Referring now to FIGS. 13 and 14, the bidirectional sphere prover 320 is mounted on a skid 340 which rests on the ground in a generally horizontal manner. Other mounting systems were previously discussed. All of the bidirectional sphere provers shown in FIGS. 10-26 include a straight calibrated section of pipe 334 which includes a first detector switch 336 on one end of the pipe and a second detector switch 338 on the other end of the pipe.

A first launch tube 348 includes a quick opening closure 350 on one end and a prior art short eccentric fabricated reducer 360 welded on the other end. The second launch tube 354 includes a removable blind plate 356 on one end and a prior art short eccentric fabricated reducer 362 welded on the other end. A 4-way valve 364 is used to reverse the flow of fluid through the straight calibrated section of pipe 334. This fluid is typically water during a water draw test; but in the field, during normal operations, this fluid is typically crude oil, a refined product such as gasoline or diesel, a natural gas liquid such as ethane or a petrochemical. The 4-way valve 364 and associated piping has been omitted from FIGS. 10-12 and 14 to make it easier to understand the drawings; but all of the bidirectional sphere provers shown in FIGS. 10-26 have and use a 4-way valve to reverse fluid flow through the straight calibrated section of pipe 334.

A first U-tube is generally identified by the numeral 370. This U-tube 370 may be fabricated from a single piece of pipe with flanges on each end. In the alternative, this U-tube 370 may be foamed from multiple pieces of pipe such as 90° elbows 374 and 375. These multiple pieces of pipe may be welded or held together by flanges secured by nuts and bolts. One end of the U-tube needs to have a flange 388 so it can mate with opposing flange 386 on the first end of the straight calibrated section of pipe 334.

A second U-tube is generally identified by the numeral 376. This U-tube may be fabricated from a single piece of pipe with flanges on each end. In the alternative, this U-tube 376 may be formed from multiple pieces of pipe such as 90° elbows 380 and 381. These multiple pieces of pipe may be welded or held together by flanges secured by nuts and bolts. The end of the U-tube needs to have a flange 382 so it can mate with opposing flange 384 on the second end of the straight calibrated section of pipe 334.

The launch tubes shown in FIGS. 13 and 14 may be tilted relative to the ground in the range of from approximately 1° to approximately 35°, and preferably in the range of from approximately 1° to approximately 25°, and more preferably from approximately 1° to approximately 15° to help the sphere roll downhill by the force of gravity from each launch tube, see FIGS. 12-16. But the elongate concentric fabricated reducers may be used with or without a tilted launch tube. The angle of tilt is measured from the centerline of the pipe, not the centerline of the launch tubes, as shown in FIGS. 15 and 16.

The diameter of the pipe in the provers appears the same in FIGS. 12 and 14, but these drawings are not to scale. FIGS. 13 and 14 are produced with larger diameter pipe in the range of from approximately 12 inches to approximately 42 inches and FIG. 12 is produced in smaller diameter pipe in the range of from approximately 10 inches to approximately 6 inches. Fabricated reducers are less expensive to make than forged reducers, especially in larger size pipe and therefore they are the most economical choice for pipe in the range of approximately 12 inches to approximately 42 inches in diameter. The pipe diameter is the diameter of the straight calibrated section of pipe 334.

FIG. 15 is a side view of a portion of the generally horizontal bidirectional sphere prover of FIG. 13 along the line 15-15. FIG. 16 is a side view of a portion of the generally horizontal bidirectional sphere prover of FIG. 13 along the line 16-16. Referring now to FIGS. 15 and 16, the prior art short eccentric fabricated reducer 362 may be welded to a conduit 366 as shown, or it may be connected by opposing flanges and held together by nuts and bolts, not shown. The prior art short eccentric fabricated reducer 360 may be welded to a conduit 368 as shown, or it may be connected by opposing flanges and held together by nuts and bolts. The angle A of the short eccentric fabricated reducer 360, as measured from the centerline of the downstream piping to the top surface 361 of the prior art short eccentric fabricated reducer is an abrupt 27° and is one of the causes for sphere launch failure.

FIG. 17 is a side view of a portion of the generally horizontal bidirectional sphere prover of FIG. 13 along the line 17-17. FIG. 18 is a side view of a portion of the generally horizontal bidirectional sphere prover of FIG. 13 along the line 18-18. Referring now to FIG. 17, a 90° elbow 381 is shown and in FIG. 18 another 90° elbow 375 is shown.

FIG. 19 is a top view of cut flat plates for production of a prior art short eccentric fabricated reducer, simplified from page 280 of the *Pressure Vessel Handbook* by Eugene F. Megyesy, 14$^{th}$ Edition, 2008 by Pressure Vessel Publishing. A first plate 402 and a second plate 404 are shown for production of a prior art short eccentric fabricated reducer. These plates are difficult to produce but are cheaper to make than a large forged reducer.

FIG. 20 is a top view of a flat plate for production of a prior art short concentric fabricated reducer. A third plate 406 is shown.

FIG. 21 is a top view of a generally horizontal bidirectional sphere prover with tilted launch tubes and elongate concentric fabricated reducers. FIG. 22 is a side view of the generally horizontal bidirectional sphere prover with tilted launch tubes and elongate concentric fabricated reducers of FIG. 21. Measured from the centerline of the pipe, not the launch tubes, the pipe in FIGS. 21 and 22 is tilted approximately 7° degrees from the ground. A sphere 456 is shown in phantom with an arrow indicating the direction of travel during launch, but the sphere is not drawn to scale relative to the pipe. A 4-way valve 364 is shown in FIG. 21, but the 4-way valve is omitted from FIG. 22 to make it easier to read FIG. 22. The generally horizontal bidirectional sphere prover 420 requires a 4-way valve 364 to reverse the fluid flow through the straight calibrated section of pipe 434. The prover is referred to as "generally horizontal" because the launch tubes are closer to being horizontal to the ground than they are being vertical to the ground.

The first launch tube 422 has a quick opening closure 424 on one end and an elongate concentric fabricated reducer 426 on the other end. To applicant's knowledge, the elongate concentric fabricated reducer 426 has never before been used on a generally horizontal type prover design or a vertical type prover design. In order to fabricate the elongate concentric fabricated reducer 426 and 452, it is necessary to determine the diameter of the inlet and the outlet. For example a common inlet diameter is 39 inches and a common outlet diameter is 29 inches. This information is given to a fabrication shop and they may refer to the Pipefitters Handbook to determine the layout of the plate. After the plate has been cut from a flat sheet of steel, it is sent through a set of metal plate rolls, preferably two times to produce a cone. The two loose edges of the cone are then welded together completing the reducer. This design produces a more concentric interior than prior art designs and the elongation of the reducer presents a reduced angle of contact with the sphere. Together, the elongate concentric fabricated reducer results in a successful sphere launch on the first attempt, and if all other components have been properly designed and assembled, a successful water draw test.

A straight conduit 427 connects to the elongate concentric fabricated reducer 426. The conduit 427 may be welded to the elongate concentric fabricated reducer 426, not shown or may be connected by opposing flanges, as shown. The conduit 427 may be one piece of pipe as shown or several pieces of pipe. The conduit 427 connects to a first U-tube generally identified by the numeral 428. The U-tube may be formed from one piece of pipe or multiple pieces of pipe. The first U-tube may be connected by welding or opposing flanges. But the end of the first U-tube 428 must end with a flange 430 which is bolted to an opposing flange 432 on the first end of the straight calibrated piece of pipe 434. A first detector switch 436 is placed proximate the first end of the straight calibrated section of pipe 434 and a second detector switch 438 is placed proximate the second end of the straight calibrated section of pipe 434.

The flange 432 is placed on the first end of the straight calibrated section of pipe 434 and a second flange 442 is placed on the opposing second end. This facilitates rapid removal of the straight calibrated section of pipe 434 during disassembly for inspections in the field and or maintenance.

A second U-tube is generally identified by the numeral 444 and is in fluid communication with the straight calibrated section of pipe 434. The second U-tube may be formed from one piece of pipe or multiple pieces of pipe as shown in FIG. 21. These multiple pieces of pipe, 462 and 470 may be welded together as shown in FIG. 21 or they may be connected by flanges, not shown, as is well known by those skilled in the art. The U-tube 444 may also include a straight conduit 445 which has a flange 440 on one end; the flange 440 is sized and arranged to mate with the flange 442 on the second end of the straight calibrated section of pipe 434. In this fashion, the U-tube 444 is in fluid communication with the straight calibrated section of pipe 434. The second U-tube 444 connects on one end to a straight conduit 446 by welding as shown in FIG. 21 or may also connect to the straight conduit 446 by flanges, not shown.

The straight conduit 446 has a flange 447 on one end that connects to a mating flange 449 on one end of the second elongate concentric fabricated reducer 452. The other end of the second concentric fabricated reducer 448 is welded to one end of the second launch tube 448. The opposing end of the second launch tube connects to removable blind plate 450.

Referring to FIG. 21, the inlet of the elongate concentric fabricated reducer 426 is indicated by the line 451 and the outlet is surrounded by the flange 460. The diameter of the reducer inlet 451 is always greater than the diameter of the outlet. Referring to FIG. 22, the direction of travel of the sphere 456 is indicated by the arrow. The diameter of the sphere is merely illustrative and not to scale. The conduit 427 is referred to as "downstream piping" relative to the sphere 456, the launch tube 422 and the elongate concentric fabricated reducer 426.

Figure 23:
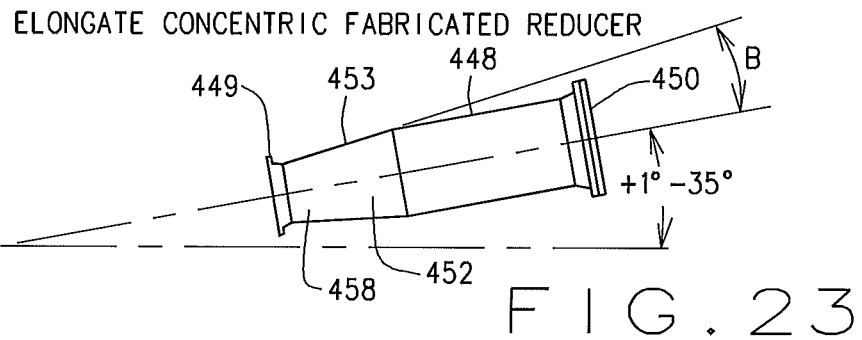
FIG. 23 is a side view of a portion of the generally horizontal bidirectional sphere prover with tilted launch tubes and elongate concentric fabricated reducer of FIG. 21 along the line 23-23.

FIG. 23 is a side view of a portion of the generally horizontal bidirectional sphere prover with tilted launch tubes and elongate concentric fabricated reducer of FIG. 21 along the line 23-23. The second launch tube 448 has a removable blind plate 450 on one end and the elongate concentric fabricated reducer 452 on the other end. A flange 449 may be welded to the outlet 458 of the reducer 452. The angle B of the elongate concentric fabricated reducer as measured from the centerline of downstream piping to the upper surface 453 is about 6°. The gentle angle B in the eccentric concentric fabricated reducer is one feature used to reduce sphere launch failure. This compares with the more abrupt angle of about 27° of prior art short eccentric reducers.

Figure 24:
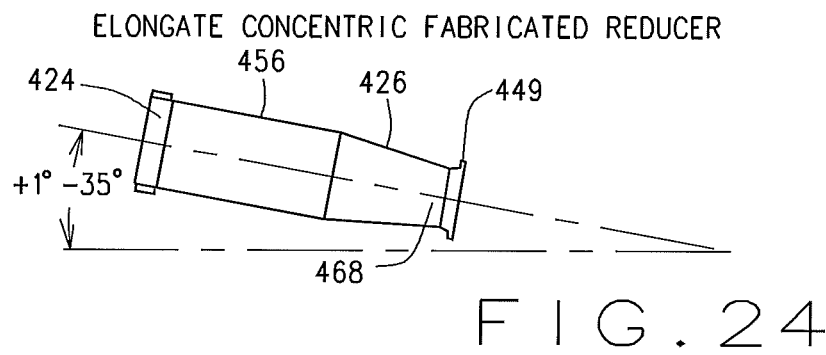
FIG. 24 is a side view of a portion of the generally horizontal bidirectional sphere prover with tilted launch tubes and elongate concentric fabricated reducers of FIG. 21 along the line 24-24.

FIG. 24 is a side view of a portion of the generally horizontal bidirectional sphere prover with tilted launch tubes and elongate concentric fabricated reducer of FIG. 21 along the line 24-24. The first launch tube 456 has a quick opening closure 424 on one end and a elongate concentric fabricated reducer 426 on the other end. A flange 460 may be welded to the reducer outlet 468 of the reducer 426.

Figure 25:
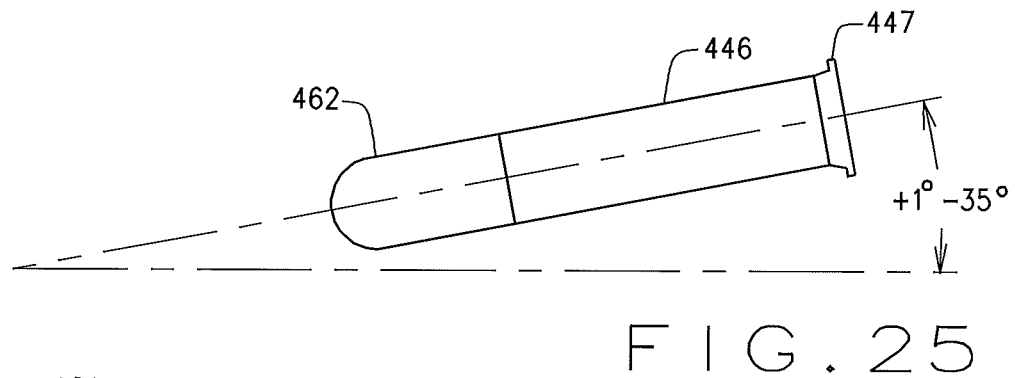
FIG. 25 is a side view of a portion of the generally horizontal bidirectional sphere prover with tilted launch tubes and elongate concentric fabricated reducers of FIG. 21 along the line 25-25.

FIG. 25 is a side view of a portion of the generally horizontal bidirectional sphere prover with tilted launch tubes and elongate concentric fabricated reducers of FIG. 21 along the line 25-25. The straight conduit 446 has a flange 447 welded on one end sized to mate with the flange 449 on the elongate concentric fabricated reducer 452. A 90° elbow 462 is welded to the straight conduit 446. The conduit 446 may be one piece of pipe or multiple pieces of pipe. The 90° elbow may be welded to the conduit 446, as shown, or may be connected by a flange as is well known to those skilled in the art. A second 90° elbow 470, better seen in FIG. 21 completes the U-tube 444. As shown, the U-tube 444 is formed from multiple pieces of pipe, or it may be fabricated from a single piece of pipe.

Figure 26:
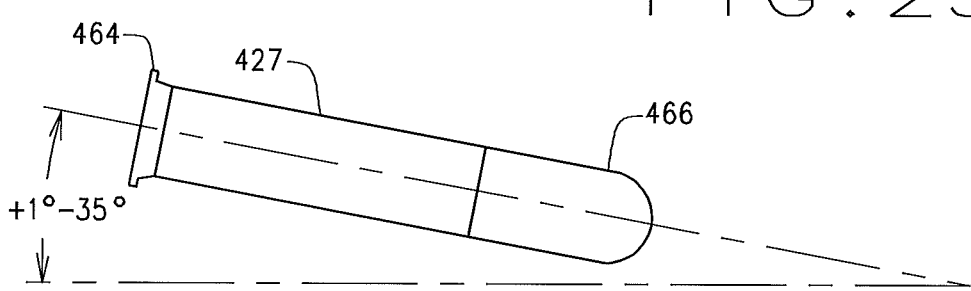
FIG. 26 is a side view of a portion of the generally horizontal bidirectional sphere prover with tilted launch tubes and elongate concentric fabricated reducers of FIG. 21 along the line 26-26.

FIG. 26 is a side view of a portion of the generally horizontal bidirectional sphere prover with tilted launch tubes and elongate concentric fabricated reducers of FIG. 21 along the line 26-26. The straight conduit 427 has a flange 464 welded to one end sized to mate with the flange 460 on the elongate concentric fabricated reducer 426. A 90° elbow 466 is welded to the conduit 427. The conduit 427 may be one piece of pipe or multiple pieces of pipe.

The 90° elbow 466 may be welded to the conduit 427, as shown or connected by flanges, not shown, as is well known to those skilled in the art. Another 90° elbow 474, better seen in FIG. 21 completes the U-tube generally identified by the numeral 428. As shown, the U-tube 428 is formed from multiple pieces of pipe, or it may be fabricated from a single piece of pipe. In addition, the U-tube 428 may include a straight conduit 429 to permit fluid communication with the U-tube 428 and the straight calibrated section of pipe 434.

The flow path for the sphere, 456, shown in phantom is as follows: The sphere moves from the first launch tube 456 through the elongate concentric fabricated reducer 426, through the conduit 427, through the U-tube 428, through the straight conduit 429, into the straight calibrated section of pipe 434, past the first detector switch 436, past the second detector switch 438, through the straight conduit 445, through the U-tube 444, through the straight conduit 446, through the elongate concentric fabricated reducer 452 and into the second launch tube 448. The 4-way valve 464 is then actuated and the flow of fluid through the prover reverses, sending the sphere in the opposite direction. The sphere then retraces its pathway as follows: The sphere moves from the second launch tube 448 through the elongate concentric fabricated reducer 452, through the straight conduit 446, through the U-tube 444, through the straight conduit 445, into the straight calibrated section of pipe 434, past the second detector switch 438, past the first detector switch 436, through the straight conduit 429, through the U-tube 428, through the straight conduit 427, through the elongate concentric fabricated reducer 426 and back into the first launch chamber 456. The 4-way valve 364 is then actuated and the flow of the fluid through the prover reverses, sending the sphere on another pass.

Figure 27:
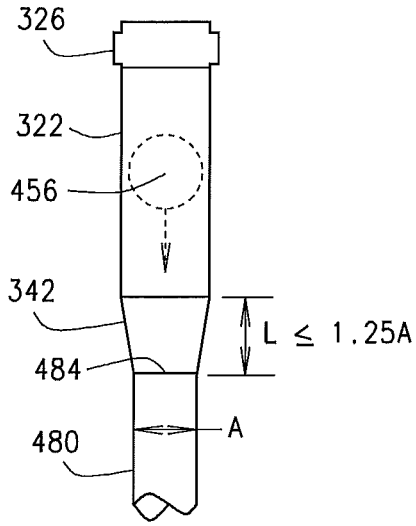
FIG. 27 is a side view of a vertical launch tube with a prior art short concentric fabricated reducer. The sphere is shown in phantom.

FIG. 27 is a side view of a vertical launch tube with a prior art short concentric fabricated reducer. The sphere 456 is shown in phantom and is not to scale. A launch tube 322 has a quick opening closure 326 on one end and a prior art short concentric fabricated reducer 342 on the other end. The prior art reducer 342 is connected to downstream piping 480 which may be straight pipe as shown or it may be a 90° elbow as shown in other drawings. The diameter of the downstream piping 480 is represented by the letter A in this figure. The length "L" of the prior art short concentric fabricated reducer is ≤1.25×L.

Figure 28:
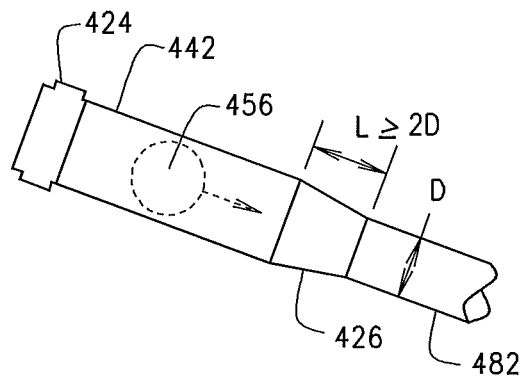
FIG. 28 is a side view of a tilted launch tube with an elongate concentric fabricated reducer.

FIG. 28 is a side view of a tilted launch tube with an elongate concentric fabricated reducer 426. The sphere 456 is shown in phantom, and is not to scale. The launch tube 442 has a quick opening closure 424 on one end and an elongate concentric fabricated reducer 426 on the other. These unique reducers 426 and 452, better seen in FIG. 22, are connected to downstream piping 482 which is typically straight pipe as shown in other drawings. The diameter of the downstream piping 482 is represented by the letter D in this figure. The length "L" of the elongate concentric fabricated reducer is at least 2×L.

The elongate concentric fabricated reducers 426 and 452 are for use on generally horizontal provers and horizontal type prover designs having a pipe diameter in the range of from approximately 12 inches to approximately 42 inches, nominal size. These new elongate concentric fabricated reducers are at least twice as long as the diameter of the downstream piping 482 connected to the reducer outlet. (In this figure, the diameter of the downstream piping is represented by the letter D.)

The new elongate concentric reducer is at least two pipe diameters long. The length of prior art short eccentric reducers of FIG. 27 and FIGS. 10 and 11 is less than 1.25 pipe diameters long. In other words, the overall length of the new elongate concentric fabricated reducers 426 and 452 are more than 60% longer than any prior art eccentric or concentric reducer ever built, to Applicant's knowledge. These elongate concentric fabricated reducers are at least twice as long as the diameter of the outlet 484 of the reducer 342. These elongate concentric fabricated reducers are designed to be used on generally horizontal provers with or without tilted launch tubes and horizontal type prover designs; the elongate concentric fabricated reducer usually results in a successful first sphere launch at the plant and in the field. A successful first sphere launch means that the water draw will not be hindered by a launch failure. If all the other components of the prover are properly designed and assembled, a successful first sphere launch will result in a successful water draw test on the first attempt. These elongate concentric fabricated reducers have solved a nagging industry wide problem.

FIG. 29 is a top view of a generally horizontal bidirectional sphere prover with tilted launch tubes and elongate concentric fabricated reducers similar to that shown in FIGS.

21 and 22, but with differences as explained below. FIG. 30 is a side elevation view of the generally horizontal bidirectional sphere prover with tilted launch tubes and elongate concentric fabricated reducers of FIG. 29. Measured from the centerline of the pipe, not the launch tubes, the pipe in FIGS. 29 and 30 is tilted approximately 7° degrees from the ground, as in FIGS. 21 and 22. A sphere 456 is shown in phantom with an arrow indicating the direction of travel during launch, but the sphere is not drawn to scale relative to the pipe. A 4-way valve 364 is shown in FIGS. 29 and 30. The generally horizontal bidirectional sphere prover 620 requires a 4-way valve 364 to reverse the fluid flow through the straight calibrated section of pipe 434. The prover is referred to as "generally horizontal" because the launch tubes are closer to being horizontal to the ground than they are being vertical to the ground.

The first launch tube 422 has a quick opening closure 424 on one end and an elongate concentric fabricated reducer 426 on the other end. To applicant's knowledge, the elongate concentric fabricated reducer 426 has never before been used on a generally horizontal type prover design or a vertical type prover design. In order to fabricate the elongate concentric fabricated reducer 426 and 452, it is necessary to determine the diameter of the inlet and the outlet. For example a common inlet diameter is 39 inches and a common outlet diameter is 29 inches. This information is given to a fabrication shop and they may refer to the Pipefitters Handbook to determine the layout of the plate. After the plate has been cut from a flat sheet of steel, it is sent through a set of metal plate rolls, preferably two times to produce a cone. The two loose edges of the cone are then welded together completing the reducer. This design produces a more concentric interior than prior art designs and the elongation of the reducer presents a reduced angle of contact with the sphere. Together, the elongate concentric fabricated reducer results in a successful sphere launch on the first attempt, and if all other components have been properly designed and assembled, a successful water draw test.

The reducer 426 connects to a first U-tube generally identified by the numeral 428. The U-tube may be formed from one piece of pipe or multiple pieces of pipe 466, 474 as shown in FIG. 29. The first U-tube 428 may be connected by welding or opposing flanges. But the end of the first U-tube 428 must end with a flange 430 which is bolted to an opposing flange 432 on the first end of the straight calibrated piece of pipe 434. A first detector switch 436 is placed proximate the first end of the straight calibrated section of pipe 434 and a second detector switch 438 is placed proximate the second end of the straight calibrated section of pipe 434.

The flange 432 is placed on the first end of the straight calibrated section of pipe 434 and a second flange 442 is placed on the opposing second end. This facilitates rapid removal of the straight calibrated section of pipe 434 during disassembly for inspections in the field and or maintenance.

A second U-tube is generally identified by the numeral 444 and is in fluid communication with the straight calibrated section of pipe 434. The second U-tube may be formed from one piece of pipe or multiple pieces of pipe as shown in FIG. 29. These multiple pieces of pipe, 462 and 470 may be welded together as shown in FIG. 29 or they may be connected by flanges, not shown, as is well known by those skilled in the art. Further, a conduit (not shown) may connect a U-tube 444 or 428 to the straight calibrated piece of pipe 434. The U-tube 444 may also include a flange 440 on one end, which is sized and arranged to mate with the flange 442 on the second end of the straight calibrated section of pipe 434. In this fashion, the U-tube 444 is in fluid communication with the straight calibrated section of pipe 434.

The U-tube 444 has a flange 447 on one end that connects to a mating flange 449 on one end of the second elongate concentric fabricated reducer 452. The other end of the second concentric fabricated reducer 452 is welded to one end of the second launch tube 448. The opposing end of the second launch tube connects to removable blind plate 450.

Referring to FIG. 29, the inlet of the elongate concentric fabricated reducer 426 is indicated by the line 451 and the outlet is surrounded by the flange 460. The diameter of the reducer inlet 451 is always greater than the diameter of the outlet. Referring to FIG. 30, the direction of travel of the sphere 456 is indicated by the arrow. The diameter of the sphere is merely illustrative and not to scale. The U-tube 428 is referred to as "downstream piping" relative to the sphere 456, the launch tube 422 and the elongate concentric fabricated reducer 426.

FIG. 31 is a block diagram of some of the components in a prior art lease automatic custody transfer unit, better known in the industry as a L.A.C.T. unit or a Petroleum Metering System used to make volumetric measurements of crude oil or other fluids. The volume is important because crude oil is sold by the barrel, itself a volumetric unit of measure. In this view, fluid is not flowing through the conventional meter prover 510. A L.A.C.T. unit 522 typically includes a sampler 502, a strainer 504, a custody transfer meter 506, a 3-valve manifold 508, a conventional meter prover 510, a back pressure valve 512, an electronic flow computer 514, all shown, and other components, not shown. The conventional meter prover 510 is typically mounted on a skid separate from the other components of the L.A.C.T. unit which are typically mounted on another skid.

As shown by the flow arrows in this view, the fluid flow from the pipeline passes the sampler 502, through the strainer 504, through the custody transfer meter 506, through the open block valve 516 in the 3-valve manifold, through the back pressure valve 512 and back to the pipeline. In this view, the block valve 516 is open and the inlet valve 518 to the conventional meter prover and the outlet valve 520 from the conventional meter prover are both closed, thus blocking fluid flow to the conventional meter prover 510, as is well known to those skilled in the art. The custody transfer meter 506 sends signals to the electronic flow computer 514 as indicated by the dashed lines which are stored in the memory of the electronic flow computer. These signals are called "pulses" in the industry. The custody transfer meter runs continuously while the L.A.C.T. unit is in operation; however, the conventional meter prover only runs periodically to check the accuracy of the conventional custody transfer meter.

The 3-valve manifold includes three valves: the block valve 516, which is typically in the open position, the inlet valve 518 to the conventional meter prover 510 and the outlet valve 520 from the conventional meter prover 510, all of which are well known to those skilled in the art. The inlet valve 518 and the outlet valve 520 to the conventional meter prover 510 are both typically in the closed position to block fluid flow through the conventional meter prover.

FIG. 32 is a block diagram of some of the components of a prior art lease automatic custody transfer unit, better known in the industry as an L.A.C.T. unit 522 or a Petroleum Metering System used to make volumetric measurements of crude oil or other fluids. In this view, fluid is flowing from the pipeline through the conventional meter prover 510, as indicated by the flow arrows. When it is time to use the conventional meter prover 510, the block valve 516 in the 3-valve manifold is closed and the inlet valve 518 and the outlet valve 520 to the conventional meter prover are both opened. Therefore, the entire fluid flow from the custody transfer meter is diverted through the conventional meter prover. Control of these three valves may be manual or by valve actuators, not shown. The flow path in this figure is as follows: from the pipeline past the sampler 502, through the strainer 504, through the custody transfer meter 506, through the inlet valve 518 of the 3-valve manifold, through inlet piping 524, to the inlet of the 4-way valve, not shown, through the conventional meter prover 510, to the outlet of the 4-way valve, through outlet piping 526, back through the outlet valve 520 in the 3-valve manifold, through the back pressure valve 512 and back into the pipeline, as indicated by the flow arrows. In this view, the block valve 516 in the 3-valve manifold is closed and the inlet valve 518 and the outlet valve 520 are both in the open position, thus allowing fluid flow through the conventional meter prover 510 as indicated by the flow arrows, as is well known to those skilled in the art. The conventional meter prover and the custody transfer valve send signals to the electronic flow computer, as indicated by the dashed lines; these signals are stored in the memory of the electronic flow computer. These signals are called "pulses" in the industry. The bidirectional sphere prover of the present invention may be substituted for the conventional meter prover 510 of FIGS. 31 and 32 to produce an improved L.A.C.T. unit 522.

The invention claimed is:

1. A bidirectional sphere prover having a 4-way valve for reversing the flow of fluids through the prover, the prover comprising:
   a) a straight calibrated section of pipe having at least a first detector switch proximate a first end and a second detector switch proximate a second end and said straight calibrated section of pipe having a first flange at the first end and a second flange at the second end;
   b) the straight calibrated section of pipe being free of flanges, lateral openings and elbows between the first detector switch and the second detector switch;
   c) the straight calibrated section of pipe defining a tubular interior surface;
   d) the first end of the straight calibrated section of pipe being in fluid communication with a first U-tube being in direct fluid communication with a first elongate concentric fabricated reducer on a first launch tube;
   e) the second end of the straight calibrated section of pipe being in fluid communication with a second U-tube being in direct fluid communication with a second elongate concentric fabricated reducer on a second launch tube;
   f) a resilient single sphere moving back and forth from the first launch tube, through the first elongate concentric fabricated reducer, through the first U-tube, through the straight calibrated section of pipe, through the second U-tube, the second elongate concentric fabricated reducer to the second launch tube, in response to actuation of the 4-way valve.

2. The apparatus of claim 1 wherein the tubular interior surface is coated with a corrosion inhibitor.

3. The apparatus of claim 2 wherein the resilient single sphere being in sealing contact with the coating of corrosion inhibitor on the tubular interior surface of the straight calibrated section of pipe.

4. The apparatus of claim 1 wherein the first elongate concentric fabricated reducer is connected on one end to the first launch tube and on the other end to the first U-tube.

5. The apparatus of claim 1 wherein the second elongate concentric fabricated reducer is connected on one end to the second launch tube and on the other end to the second U-tube.

6. The apparatus of claim 1 wherein the first U-tube further includes a straight conduit having a flange on one end which connects to the first flange on the first end of the straight calibrated section of pipe.

7. The apparatus of claim 1 wherein the second U-tube further includes a straight conduit having a flange on one end which connects to the second flange on the second end of the straight calibrated section of pipe.

8. A method for calibrating a custody transfer valve comprising the following steps:
   providing a bidirectional sphere prover and a 4-way valve;
   moving a single resilient sphere through a first launch tube, through a first elongate concentric fabricated reducer and directly to a first U-tube, and into a straight calibrated section of pipe;
   moving the single resilient sphere past a first detector switch and a second detector switch in the straight calibrated section of pipe;
   moving the single resilient sphere through a second U-tube and directly to a second elongate fabricated reducer, and back into a second launch tube; and
   actuating the 4-way valve to reverse fluid flow through the bidirectional sphere prover.

9. In combination, a lease automatic custody transfer unit comprising:
   a sampler, in fluid communication with a strainer;
   the strainer in fluid communication with a custody transfer meter;
   the custody transfer meter in fluid communication with a 3-way valve manifold;
   the 3-valve manifold in selective fluid communication with a bidirectional sphere prover having a 4-way valve for reversing the flow of fluids through the prover;
   a back pressure valve in fluid communication with the 3-valve manifold;
   an electronic flow computer receiving signals from the custody transfer meter and the bidirectional sphere prover;
   the bidirectional sphere prover having:
   a) a straight calibrated section of pipe having at least a first detector switch proximate a first end and a second detector switch proximate a second end and said straight calibrated section of pipe having a first flange at the first end and a second flange at the second end;
   b) the straight calibrated section of pipe being free of flanges, lateral openings and elbows between the first detector switch and the second detector switch;
   c) the straight calibrated section of pipe defining a tubular interior surface;
   d) the first end of the straight calibrated section of pipe being in fluid communication with a first U-tube being in fluid direct communication with a first elongate concentric fabricated reducer on a first launch tube;
   e) the second end of the straight calibrated section of pipe being in fluid communication with a second U-tube being in direct fluid communication with a second elongate concentric fabricated reducer on a second launch tube;

f) a resilient single sphere moving back and forth from the first launch tube, through the first elongate concentric fabricated reducer, through the first U-tube, through the straight calibrated section of pipe, through the second U-tube, the second elongate concentric fabricated reducer to the second launch tube, in response to actuation of the 4-way valve.

10. A bidirectional sphere prover comprising:

a) a 4-way valve for reversing the flow of fluids through the bidirectional sphere prover;

b) a straight calibrated section of pipe having at least a first detector switch proximate a first end and a second detector switch proximate a second end and said straight calibrated section of pipe having a first flange at the first end and a second flange at the second end;

c) the straight calibrated section of pipe being free of flanges, lateral openings and elbows between the first detector switch and the second detector switch;

d) the straight calibrated section of pipe defining a tubular interior surface;

e) the first end of the straight calibrated section of pipe being in fluid communication with a first U-tube being in direct fluid communication with a first elongate concentric fabricated reducer on a first end of a first launch tube;

f) the second end of the straight calibrated section of pipe being in fluid communication with a second U-tube being in direct fluid communication with a second elongate concentric fabricated reducer on a first end of a second launch tube; and g) a resilient single sphere moving back and forth from the first launch tube, through the first elongate concentric fabricated reducer, through the first U-tube, through the straight calibrated section of pipe, through the second U-tube, the second elongate concentric fabricated reducer to the second launch tube, in response to actuation of the 4-way valve.

11. The bidirectional sphere prover of claim 10 wherein the tubular interior surface is coated with a corrosion inhibitor.

12. The bidirectional sphere prover of claim 11 wherein the resilient single sphere being in sealing contact with the coating of corrosion inhibitor on the tubular interior surface of the straight calibrated section of pipe.

13. The bidirectional sphere prover of claim 10 wherein the first U-tube further includes a straight conduit having a flange on one end which connects to the first flange on the first end of the straight calibrated section of pipe.

14. The bidirectional sphere prover of claim 10 wherein the second U-tube further includes a straight conduit having a flange on one end which connects to the second flange on the second end of the straight calibrated section of pipe.

* * * * *

UNITED STATES PATENT AND TRADEMARK OFFICE
CERTIFICATE OF CORRECTION

PATENT NO.        : 9,719,837 B2
APPLICATION NO.   : 14/457702
DATED             : August 1, 2017
INVENTOR(S)       : Daniel J. Rudroff Page 1 of 1

It is certified that error appears in the above-identified patent and that said Letters Patent is hereby corrected as shown below:

In Column 18, Line 38 replace the term "foamed" with -- formed --

Signed and Sealed this
Third Day of October, 2017

Joseph Matal
*Performing the Functions and Duties of the*
*Under Secretary of Commerce for Intellectual Property and*
*Director of the United States Patent and Trademark Office*